(12) United States Patent
Schiller

(10) Patent No.: US 11,475,026 B2
(45) Date of Patent: Oct. 18, 2022

(54) VALUE DISCREPANCY VISUALIZATION APPARATUS AND METHOD THEREOF

(71) Applicant: Douglas Schiller, Los Angeles, CA (US)

(72) Inventor: Douglas Schiller, Los Angeles, CA (US)

( * ) Notice: Subject to any disclaimer, the term of this patent is extended or adjusted under 35 U.S.C. 154(b) by 919 days.

(21) Appl. No.: 15/440,434

(22) Filed: Feb. 23, 2017

(65) Prior Publication Data
US 2017/0249366 A1    Aug. 31, 2017

Related U.S. Application Data

(60) Provisional application No. 62/300,331, filed on Feb. 26, 2016.

(51) Int. Cl.

| | |
|---|---|
| *G06F 16/24* | (2019.01) |
| *G06F 7/50* | (2006.01) |
| *G06F 16/21* | (2019.01) |
| *G06F 16/2458* | (2019.01) |
| *G06Q 10/00* | (2012.01) |
| *G06F 16/903* | (2019.01) |

(Continued)

(52) U.S. Cl.
CPC ............ *G06F 16/2468* (2019.01); *G06F 7/50* (2013.01); *G06F 16/215* (2019.01); *G06F 16/90344* (2019.01); *G06N 5/048* (2013.01); *G06Q 10/00* (2013.01)

(58) Field of Classification Search
USPC ........................................................ 707/690
See application file for complete search history.

(56) References Cited

U.S. PATENT DOCUMENTS

| | | | | |
|---|---|---|---|---|
| 8,443,013 | B1 * | 5/2013 | Lin ........................ | G06Q 10/04 707/810 |
| 9,323,748 | B2 * | 4/2016 | Anderson ............. | G06F 16/245 |
| 9,628,499 | B1 * | 4/2017 | Yu ......................... | G06F 21/552 |

(Continued)

*Primary Examiner* — Tamara T Kyle
*Assistant Examiner* — Raheem Hoffler
(74) *Attorney, Agent, or Firm* — Caesar Rivise, PC

(57) ABSTRACT

An apparatus and method displays an error between a first sequence of numbers and a second sequence of numbers. A plurality of respectively different algorithms is provided for comparing the first sequence of numbers and the second sequence of numbers. At least one of the algorithms is selected to compare the first sequence of numbers and the second sequence of numbers. The selected algorithm(s) are applied to the first sequence of numbers and the second sequence of numbers in order to identify the error, wherein the error is a discrepancy between one of the numbers in the first sequence and another of the numbers in the second sequence. The error is displayed by simultaneously displaying and indicating the numbers from each sequence that have the discrepancy. For at least one of the algorithms the numbers from each of the sequences have a matching associated label. At least one of the algorithms applies fuzzy matching to the numbers from each of the sequences. At least one of the algorithms adds the numbers from one of the sequences to obtain a partial addition sum and displays the partial addition sum with one of the numbers from the other sequence. For at least one of the algorithms the discrepancy is between non-identical positions within the two sequences.

10 Claims, 38 Drawing Sheets

```
maxcombos(40,1e14)
  1. values=40 res=40 cap=100000000000000 cum=40 i=1
  2. values=40 res=780 cap=100000000000000 cum=820 i=2
  3. values=40 res=9880 cap=100000000000000 cum=10,700 i=3
  4. values=40 res=91390 cap=100000000000000 cum=102,090 i=4
  5. values=40 res=658008 cap=100000000000000 cum=760,098 i=5
  6. values=40 res=3838380 cap=100000000000000 cum=4,598,478 i=6
  7. values=40 res=18643560 cap=100000000000000 cum=23,242,038 i=7
  8. values=40 res=76904685 cap=100000000000000 cum=100,146,723 i=8
  9. values=40 res=273438880 cap=100000000000000 cum=373,585,603 i=9
 10. values=40 res=847660528 cap=100000000000000 cum=1,221,246,131 i=10
 11. values=40 res=2311801440 cap=100000000000000 cum=3,533,047,571 i=11
 12. values=40 res=5586853480 cap=100000000000000 cum=9,119,901,051 i=12
 13. values=40 res=12033222880 cap=100000000000000 cum=21,153,123,931 i=13
 14. values=40 res=23206929840 cap=100000000000000 cum=44,360,053,771 i=14
 15. values=40 res=40225345056 cap=100000000000000 cum=84,585,398,827 i=15
 16. values=40 res=62852101650 cap=100000000000000 cum=147,437,500,477 i=16
 17. values=40 res=88732378800 cap=100000000000000 cum=236,169,879,277 i=17
 18. values=40 res=113380261800 cap=100000000000000 cum=349,550,141,077 i=18
 19. values=40 res=131282408400.00002 cap=100000000000000 cum=480,832,549,477 i=19
 20. values=40 res=137846528820.00003 cap=100000000000000 cum=618,679,078,297 i=20
 21. values=40 res=131282408400.00002 cap=100000000000000 cum=749,961,486,697 i=21
 22. values=40 res=113380261800.00002 cap=100000000000000 cum=863,341,748,497 i=22
```

(51) Int. Cl.
*G06N 5/04* (2006.01)
*G06F 16/215* (2019.01)

(56) References Cited

U.S. PATENT DOCUMENTS

| | | | | |
|---|---|---|---|---|
| 10,497,064 B2* | 12/2019 | Wagner | ............... | G06Q 40/12 |
| 2009/0119323 A1* | 5/2009 | Grichnik | ............... | G06F 16/335 |
| 2012/0278349 A1* | 11/2012 | Bidlack | ............... | G06F 16/215 |
| | | | | 707/758 |
| 2013/0275451 A1* | 10/2013 | Lewis | ............... | G06F 16/93 |
| | | | | 707/758 |
| 2014/0369602 A1* | 12/2014 | Meier | ............... | G06K 9/6218 |
| | | | | 382/182 |
| 2015/0019216 A1* | 1/2015 | Singh | ............... | G06F 16/24578 |
| | | | | 704/235 |
| 2015/0106265 A1* | 4/2015 | Stubblefield | ............... | G06Q 50/265 |
| | | | | 705/44 |
| 2016/0027123 A1* | 1/2016 | Bong | ............... | G06Q 40/12 |
| | | | | 705/30 |
| 2016/0078367 A1* | 3/2016 | Adjaoute | ............... | G06N 5/04 |
| | | | | 706/12 |
| 2019/0171704 A1* | 6/2019 | Buisson | ............... | G06F 16/258 |

* cited by examiner maxcombos(40,1e14)

1. values=40 res=40 cap=100000000000000 cum=40 i=1
2. values=40 res=780 cap=100000000000000 cum=820 i=2
3. values=40 res=9880 cap=100000000000000 cum=10,700 i=3
4. values=40 res=91390 cap=100000000000000 cum=102,090 i=4
5. values=40 res=658008 cap=100000000000000 cum=760,098 i=5
6. values=40 res=3838380 cap=100000000000000 cum=4,598,478 i=6
7. values=40 res=18643560 cap=100000000000000 cum=23,242,038 i=7
8. values=40 res=76904685 cap=100000000000000 cum=100,146,723 i=8
9. values=40 res=273438880 cap=100000000000000 cum=373,585,603 i=9
10. values=40 res=847660528 cap=100000000000000 cum=1,221,246,131 i=10
11. values=40 res=2311801440 cap=100000000000000 cum=3,533,047,571 i=11
12. values=40 res=5586853480 cap=100000000000000 cum=9,119,901,051 i=12
13. values=40 res=12033222880 cap=100000000000000 cum=21,153,123,931 i=13
14. values=40 res=23206929840 cap=100000000000000 cum=44,360,053,771 i=14
15. values=40 res=40225345056 cap=100000000000000 cum=84,585,398,827 i=15
16. values=40 res=62852101650 cap=100000000000000 cum=147,437,500,477 i=16
17. values=40 res=88723378800 cap=100000000000000 cum=236,169,879,277 i=17
18. values=40 res=113380261800 cap=100000000000000 cum=349,550,141,077 i=18
19. values=40 res=131282408400.00002 cap=100000000000000 cum=480,832,549,477 i=19
20. values=40 res=137846528820.00003 cap=100000000000000 cum=618,679,078,297 i=20
21. values=40 res=131282408400.00002 cap=100000000000000 cum=749,961,486,697 i=21
22. values=40 res=113380261800.00002 cap=100000000000000 cum=863,341,748,497 i=22

Figure 1A 23. values=40 res=88732378800 cap=100000000000000 cum=952,074,127,297 i=23
24. values=40 res=62852101650.00001 cap=100000000000000 cum=1,014,926,228,947 i=24
25. values=40 res=40225345056 cap=100000000000000 cum=1,055,151,574,003 i=25
26. values=40 res=23206929840 cap=100000000000000 cum=1,078,358,503,843 i=26
27. values=40 res=12033222880 cap=100000000000000 cum=1,090,391,726,723 i=27
28. values=40 res=5586853480.000001 cap=100000000000000 cum=1,095,978,580,203 i=28
29. values=40 res=2311801440.0000005 cap=100000000000000 cum=1,098,290,381,643 i=29
30. values=40 res=847660528.0000001 cap=100000000000000 cum=1,099,138,042,171 i=30
31. values=40 res=273438880.00000006 cap=100000000000000 cum=1,099,411,481,051 i=31
32. values=40 res=76904685 cap=100000000000000 cum=1,099,488,385,736 i=32
33. values=40 res=18643560 cap=100000000000000 cum=1,099,507,029,296 i=33
34. values=40 res=3838380.0000000005 cap=100000000000000 cum=1,099,510,867,676 i=34
35. values=40 res=658008.0000000001 cap=100000000000000 cum=1,099,511,525,684 i=35
36. values=40 res=91390.00000000003 cap=100000000000000 cum=1,099,511,617,074 i=36
37. values=40 res=9880.000000000004 cap=100000000000000 cum=1,099,511,626,954 i=37
38. values=40 res=780.0000000000003 cap=100000000000000 cum=1,099,511,627,734 i=38
39. values=40 res=40.000000000000014 cap=100000000000000 cum=1,099,511,627,774 i=39
40. values=40 res=1.0000000000000004 cap=100000000000000 cum=1,099,511,627,775 i=40

Returns this object with the count

Object {arr: Array[40], cum: 1099511627775, maxgroup: 40, count: 1099511627775, countstr: "1,099,511,627,775"}

Screenshot

[screenshot image]

Map for above data:

rowpairsArr[1] = ["10000,AAA", [1],[1] ]

rowpairsArr[2] = ["10000,BBB", [2],[ ] ]

rowpairsArr[3] = ["20000,AAA", [3],[ ] ]

rowpairsArr[4] = ["20000,BBB", [4],[ ] ]

rowpairsArr[1] = ["30000,AAA", [ ],[2] ]

Another view showing dupes only (only rowpairsArr[1] would be shown):

[screenshot image]

Figure 8

BEFORE FUZZY MATCH:

AFTER FUZZY MATCH:

REDLINE:

Score: 57.1%
Left Side: DOUGLAS
Right Side: DOUG
Redline: DOUG -LAS

Given this data:

Left Side

| A | B | C |
|---|---|---|
| Customer | Location | amt |
| Bill | Portland | $20.00 |
| James | San Francisco | $15.00 |
| Douglas | Los Angeles | $20.00 |
| Henry | Seattle | $15.00 |
| Brian | San Diego | $15.00 |

Right Side

| L | M | N |
|---|---|---|
| Client | City | Amount |
| Bill | Portland | $20.00 |
| Brian | San Diego | $15.00 |
| Doug | Los Angeles | $20.00 |
| Henry | Seattle | $15.00 |
| James | San Francisco | $15.00 |

Setup Wizard looks initially looks like

Figure 15A

Section 1: Given this data, comparing left to right:

Left Side

| A | B | C |
|---|---|---|
| Customer | Location | amt |
| Bill | Portland | $20.00 |
| James | San Francisco | $15.00 |
| Douglas | Los Angeles | $20.00 |
| Henry | Seattle | $15.00 |
| Brian | San Diego | $15.00 |

Right Side

| L | M | N |
|---|---|---|
| Client | City | Amount |
| Bill | Portland | $20.00 |
| Brian | San Diego | $15.00 |
| Doug | Los Angeles | $20.00 |
| Henry | Seattle | $15.00 |
| James | San Francisco | $15.00 |

Section 2: clear settings so all columns are displayed.

Section 3: set columns A and L which refer to Customer and Client, as key fields.

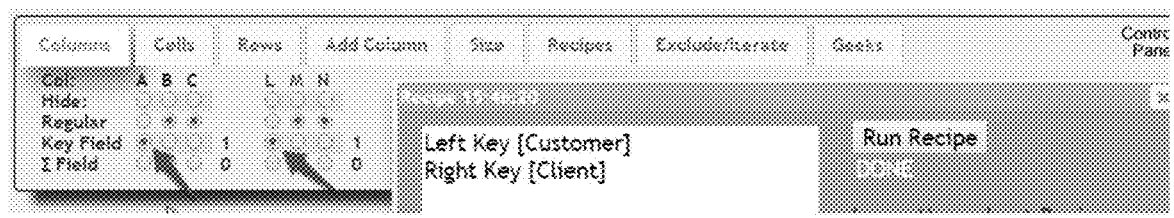

Figure 15B

Section 4: set columns C and N which refer to "amt" and "Amount", as Sum fields.

Figure 16A

CHOOSE AND SET COLUMNS

If you have many columns and only want to see those with errors:

HIDE ALL COLUMN WITHOUT ERRORS
ONLY SHOW ERRORS
ONLY SHOW COLUMNS WITH ERRORS
ONLY SHOW COLS WITH ERRORS
HIDE COLUMNS WITHOUT ERRORS

If you want to show all columns again:

DISPLAY ALL COLUMNS
SHOW ALL COLUMNS
COLUMNS SHOW ALL

Set conditions for specific columns

LEFT HIDE all but A
RIGHT Regular ALL
Right Sum T
LEFT key b,d

Setting deduplication

DEDUPLICATION ON
REMOVE DUPLICATES OFF
DEDUPE FALSE
DUPE YES

Figure 16B

CONDITIONS

If you need to limit processing to rows, for example, a time period or all asterisked fields

CLEAR CONDITIONS

ADD CONDITION
AC

Examples:

AC LEFT A = 1010
AC RIGHT L IS BLANK (or IS EMPTY)
AC RIGHT T IS A NUMBER
AC RIGHT T IS A DATE
AC RIGHT T IS A DATE
AC RIGHT T IS NOT BLANK (or IS NOT EMPTY)
AC RIGHT T DOES NOT EQUAL 1010
AC RIGHT T NOT EQUAL TO 1010
AC RIGHT T != 1010
AC RIGHT T <> 1010
AC RIGHT T DOES NOT CONTAIN 1010
AC RIGHT T CONTAINS 1010

Figure 16C

VALUE SETTINGS

CASE INSENSITIVE ON | OFF | TRUE | FALSE | YES | NO
CASE INSENSITIVITY ON | OFF | TRUE | FALSE | YES | NO
CASE ON | OFF | TRUE | FALSE | YES | NO

REMOVE PUNCTUATION (PUNCTUATION | SPECIAL CHARACTERS) ON | OFF | TRUE | FALSE | YES | NO

ROUND TO ZERO (ROUND TO 0 | ROUND ) ON | OFF | TRUE | FALSE | YES | NO

Control signs (+/-)

LEAVE SIGNS TRUE | FALSE | YES | NO
NORMAL SIGNS TRUE | FALSE | YES | NO
REVERSE SIGNS TRUE | FALSE | YES | NO
x-1 TRUE | FALSE | YES | NO
*-1 TRUE | FALSE | YES | NO

ABSOLUTE VALUE TRUE | FALSE | YES | NO

|x| TRUE | FALSE | YES | NO

Types of Values ON | OFF | TRUE | FALSE | YES | NOPROCESS ALL TYPES

PROCESS ALL FORMATS
PROCESS ALL
ALL FORMATS
ALL TYPES
PROCESS NUMBERS ONLY
PROCESS NUMBERS
NUMBERS ONLY
PROCESS TEXT ONLY
PROCESS TEXT
TEXT ONLY
PROCESS DATES ONLY
PROCESS DATES
DATES ONLY
PROCESS EMAIL ONLY
PROCESS EMAIL
EMAIL FIX
FIX EMAIL BRACKETS
FIX BRACKETS
FIX EMAIL

Figure 16D

COLUMN FORMULAS

If you need a column with a custom formula, you can add simple plus and minus formulas like debits and credits, from the control panel. Recipes give more flexibility. Start off with one of these three instructions

- ADD COLUMN
- FORMULA
- ADD FORMULA then add this the side (LEFT or RIGHT)

then add the column or the header text inside a bracket then if you want a simple plus or minus formula, you can add + or - then you can add the second column

Optionally add AS [col name] so you can refer to it in other formulas

Examples:

- ADD FORMULA LEFT [debit] - [credit] AS NET
- add column right [DEBIT] - [CREDIT] as amount
- FORMULA RIGHT D - C Two more advanced formulas only available with recipes is SPLIT and MONTH.

The split recipe instruction will take a value and split it based on a delimiter like a dash. Then you tell it to take the FIRST or LAST part of the dash.

Examples:

- add column right [telephone] split - first as areacode
- add column left [apt] split / last as subunit The newest recipe instruction converts a date into a month. This is very useful. So if you have 7/26/2015, but you really need 2015-07, here are examples:

- add column right [date] convert to month AS [YYYY-MM]
- add column left [date] convert to month AS [month]

Figure 18

1 Payment $46,467.08

22 Bills 1. 18,345.60
2. 13,555.68
3. 12,700.80
4. 12,421.80
5. 9,792.40
6. 9,172.80
7. 8,467.20
8. 6,048.00
9. 4,309.35
10. 2,620.80
11. 2,620.80
12. 1,965.60
13. 1,905.60
14. 1,310.40
15. 1,209.60
16. 1,172.40
17. 1,106.40
18. 743.60
19. 586.20
20. 582.00
21. 368.80
22. 368.80

Which bills are being paid?

Figure 19A

| Combos | Left Cell | Left Value | Right Cell | Right Value |
|---|---|---|---|---|
| 1 of 7 | A000021 | 368.80 | L000001 | 46,467.08 |
| 1 of 7 | A000019 | 586.20 | | |
| 1 of 7 | A000017 | 1,106.40 | | |
| 1 of 7 | A000015 | 1,209.60 | | |
| 1 of 7 | A000013 | 1,905.60 | | |
| 1 of 7 | A000010 | 2,620.80 | | |
| 1 of 7 | A000011 | 2,620.80 | | |
| 1 of 7 | A000005 | 9,792.40 | | |
| 1 of 7 | A000003 | 12,700.80 | | |
| 1 of 7 | A000002 | 13,555.68 | | |
| - - - | - - - | - - - | - - - | - - - |
| 2 of 7 | A000021 | 368.80 | | |
| 2 of 7 | A000019 | 586.20 | | |
| 2 of 7 | A000017 | 1,106.40 | | |
| 2 of 7 | A000014 | 1,310.40 | | |
| 2 of 7 | A000013 | 1,905.60 | | |
| 2 of 7 | A000010 | 2,620.80 | | |
| 2 of 7 | A000008 | 6,048.00 | | |
| 2 of 7 | A000006 | 9,172.80 | | |
| 2 of 7 | A000005 | 9,792.40 | | |
| 2 of 7 | A000002 | 13,555.68 | | |
| - - - | - - - | - - - | - - - | - - - |
| 3 of 7 | A000021 | 368.80 | | |
| 3 of 7 | A000019 | 586.20 | | |
| 3 of 7 | A000017 | 1,106.40 | | |
| 3 of 7 | A000014 | 1,310.40 | | |
| 3 of 7 | A000013 | 1,905.60 | | |
| 3 of 7 | A000011 | 2,620.80 | | |
| 3 of 7 | A000008 | 6,048.00 | | |
| 3 of 7 | A000006 | 9,172.80 | | |
| 3 of 7 | A000005 | 9,792.40 | | |
| 3 of 7 | A000002 | 13,555.68 | | |
| - - - | - - - | - - - | - - - | - - - |
| 4 of 7 | A000022 | 368.80 | | |
| 4 of 7 | A000019 | 586.20 | | |
| 4 of 7 | A000017 | 1,106.40 | | |
| 4 of 7 | A000015 | 1,209.60 | | |
| 4 of 7 | A000013 | 1,905.60 | | |
| 4 of 7 | A000010 | 2,620.80 | | |
| 4 of 7 | A000011 | 2,620.80 | | |

Figure 19B

| | | | | |
|---|---|---|---|---|
| 4 of 7 | A000005 | 9,792.40 | | |
| 4 of 7 | A000003 | 12,700.80 | | |
| 4 of 7 | A000002 | 13,555.68 | | |
| - - - | - - - | - - - | - - - | - - - |
| 5 of 7 | A000022 | 368.80 | | |
| 5 of 7 | A000019 | 586.20 | | |
| 5 of 7 | A000017 | 1,106.40 | | |
| 5 of 7 | A000014 | 1,310.40 | | |
| 5 of 7 | A000013 | 1,905.60 | | |
| 5 of 7 | A000010 | 2,620.80 | | |
| 5 of 7 | A000008 | 6,048.00 | | |
| 5 of 7 | A000006 | 9,172.80 | | |
| 5 of 7 | A000005 | 9,792.40 | | |
| 5 of 7 | A000002 | 13,555.68 | | |
| - - - | - - - | - - - | - - - | - - - |
| 6 of 7 | A000022 | 368.80 | | |
| 6 of 7 | A000019 | 586.20 | | |
| 6 of 7 | A000017 | 1,106.40 | | |
| 6 of 7 | A000014 | 1,310.40 | | |
| 6 of 7 | A000013 | 1,905.60 | | |
| 6 of 7 | A000011 | 2,620.80 | | |
| 6 of 7 | A000008 | 6,048.00 | | |
| 6 of 7 | A000006 | 9,172.80 | | |
| 6 of 7 | A000005 | 9,792.40 | | |
| 6 of 7 | A000002 | 13,555.68 | | |
| - - - | - - - | - - - | - - - | - - - |
| 7 of 7 | A000020 | 582.00 | | |
| 7 of 7 | A000019 | 586.20 | | |
| 7 of 7 | A000018 | 743.60 | | |
| 7 of 7 | A000016 | 1,172.40 | | |
| 7 of 7 | A000013 | 1,905.60 | | |
| 7 of 7 | A000008 | 6,048.00 | | |
| 7 of 7 | A000006 | 9,172.80 | | |
| 7 of 7 | A000003 | 12,700.80 | | |
| 7 of 7 | A000002 | 13,555.68 | | |

Table 1 – Count of combinations for each value in all possible solutions

| Row | Value | Count |
|---|---|---|
| 2 | 13,555.68 | 7 |
| 3 | 12,700.80 | 3 |
| 5 | 9,792.40 | 6 |
| 6 | 9,172.80 | 5 |
| 8 | 6,048.00 | 5 |
| 10 | 2,620.80 | 4 |
| 11 | 2,620.80 | 4 |
| 13 | 1,905.60 | 7 |
| 14 | 1,310.40 | 4 |
| 15 | 1,209.60 | 2 |
| 16 | 1,172.40 | 1 |
| 17 | 1,106.40 | 6 |
| 18 | 743.60 | 1 |
| 19 | 586.20 | 7 |
| 20 | 582.00 | 1 |
| 21 | 368.80 | 3 |
| 22 | 368.80 | 3 |

Screenshot of filter and revised results

To recap, there are seven solutions. But let's say user knows that the solution he needs includes row 16 with a value of $1,172.40. User can filter all of the solutions to only show those that include that $1,172.40 value. Filter shown below:

| Row | Value | Count |
|---|---|---|
| 2 | 13,555.68 | 1 |
| 3 | 12,700.80 | 1 |
| 5 | 9,792.40 | |
| 6 | 9,172.80 | 1 |
| 8 | 6,048.00 | 1 |
| 10 | 2,620.80 | |
| 11 | 2,620.80 | |
| 13 | 1,905.60 | 1 |
| 14 | 1,310.40 | |
| 15 | 1,209.60 | |
| 16 | 1,172.40 | 1 |
| 17 | 1,106.40 | |
| 18 | 743.60 | 1 |
| 19 | 586.20 | 1 |
| 20 | 582.00 | 1 |
| 21 | 368.80 | |
| 22 | 368.80 | |

Figure 22
Website
Input Screen shot
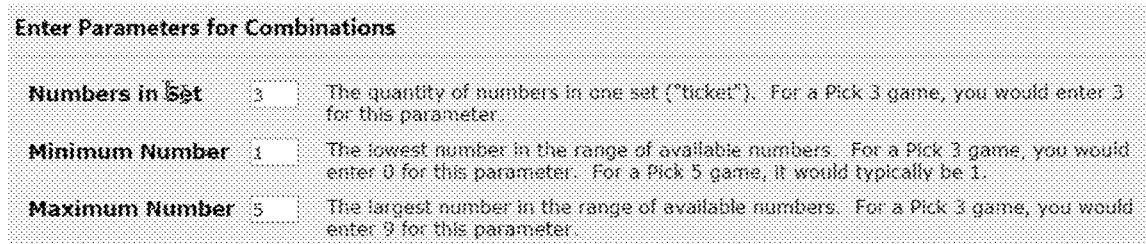
Output.
| | |
|---|---|
| Finished! | 1-2-3 |
| Calculation time: 0.02 seconds | 1-2-4 |
| Load time: 0.002 seconds | 1-2-5 |
| Total processing time: 0.022 seconds | 1-3-4 |
| Numbers in set: 3 | 1-3-5 |
| Minimum number: 1 | 1-4-5 |
| Maximum number: 5 | 2-3-4 |
| Sample frequency: 1 | 2-3-5 |
| Display type: Non-scrolling | 2-4-5 |
| Total combinations: 10 | 3-4-5 |
| | |
| | Created by Lottery Combinations Generator |
| | https://www.lotterypost.com/combinations |

Figure 23 values=22 res=22 cap=2000000 cum=22 i=1
values=22 res=231 cap=2000000 cum=253 i=2
values=22 res=1540 cap=2000000 cum=1,793 i=3
values=22 res=7315 cap=2000000 cum=9,108 i=4
values=22 res=26334 cap=2000000 cum=35,442 i=5
values=22 res=74613 cap=2000000 cum=110,055 i=6
values=22 res=170544 cap=2000000 cum=280,599 i=7
values=22 res=319770 cap=2000000 cum=600,369 i=8
values=22 res=497420 cap=2000000 cum=1,097,789 i=9
values=22 res=646646 cap=2000000 cum=1,744,435 i=10
values=22 res=705432 cap=2000000 cum=2,449,867 i=11

Figure 24
Taken 4 at a time would be:
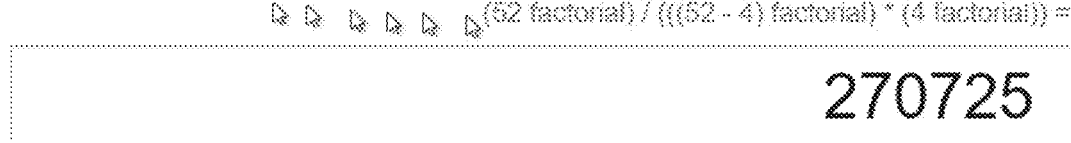
Taken 3 at a time would be:
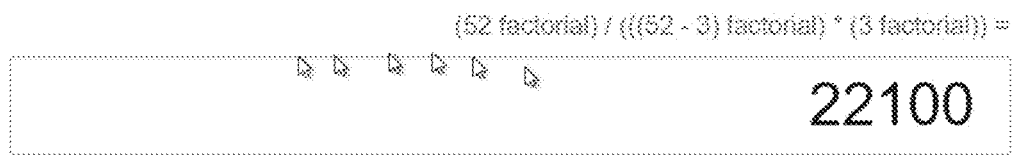
Taken 2 at a time would be:
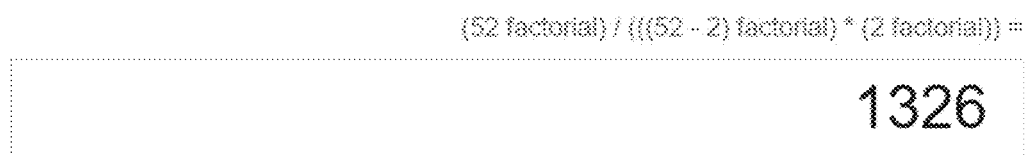
Taken 1 at a tie would be:
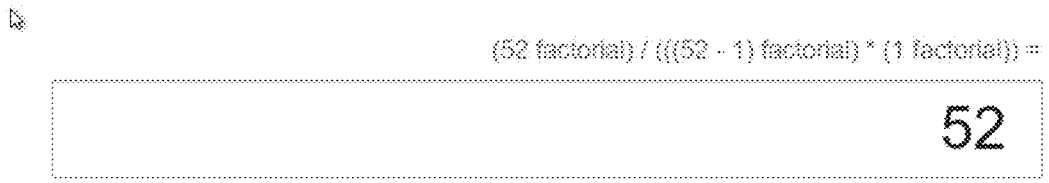

Figure 28

| Person | Amount |
|---|---|
| Bill | $20.00 |
| James | $45.00 |
| Doug | $20.00 |
| Henry | $25.00 |
| Brian | $15.00 |
| Total | $125.00 |

| Person | Amount |
|---|---|
| Bill | $20.00 |
| Brianna | $18.00 |
| James | $50.00 |
| Doug | $20.00 |
| Henry | $25.00 |
| Total | $133.00 |

|   | Primary | Alternative 1 | Alternative 2 | Alternative 3 | Alternative 4 |
|---|---|---|---|---|---|
| 1 | amount | amt | net amount | net | value |
| 2 | account | acct | account description | account descrip | Acct No |
| 3 | acctnum | account number | | | |
| 4 | number | num | | | |
| 5 | customer | cust | client | | |
| 6 | customerid | custnumber | customer id | customer number | customer # |
| 7 | email | e-mail | | | |
| 8 | transaction id | trans id | transactionid | transid | |

FIG. 30

VALUE DISCREPANCY VISUALIZATION APPARATUS AND METHOD THEREOF

This application claims priority under 35 USC 119 to U.S. provisional application 62/300,331 filed on Feb. 26, 2016 which is hereby incorporated by reference in its entirety.

FIELD OF THE INVENTION

The present invention relates to data management and more specifically to visualization technology associated therewith. In particular, a method and apparatus are disclosed for facilitating identification of errors in stored values based on visualization technology.

BACKGROUND OF THE INVENTION

In the process of matching bills and payments, there are often many sources of discrepancy. There could be missing items. There could be inaccurate dates. There could be transposed amounts. There could be naming convention discrepancies ("Bill and Jane's Deli" or "Bill & Janes Delicatessen, Inc.") There could be one payment to pay several bills. Or several bills to match one payment. These are merely examples of the types of discrepancies that may exist.

In some cases, with small quantities of data, one or more people can reasonably find these errors manually. With large quantities of data, the solutions are often impossible (or extremely difficult) to be completed by one or more human beings. For example, if there are 20 bills and 3 payments, there are approximately 1 million combinations of the 20 bills and 7 combinations of the 3 payments. Altogether, that would mean there are 7 million potential solutions. Only one may be viable, but it's next to impossible to identify that one solution manually. The number of combinations becomes exponentially much greater even with slightly more numbers. To show how rapidly the problem scales, 30 bills have 8.6 million combinations. 40 bills have 1,099,511,627,775 combinations (See FIGS. 1A and 1B).

BRIEF DESCRIPTION OF THE DRAWINGS

FIGS. 1A and 1B are a chart that illustrates a function that uses an equation known in the prior art to calculate the total number of combinations obtainable from a set of data.

FIG. 5A is a flowchart diagram that illustrates operation of an exemplary embodiment of the present invention.

FIGS. 5B and 5C are a screenshot that illustrates the operation of the exemplary embodiment illustrated in FIG. 5A.

FIG. 7 is a screenshot that illustrates the operation of an exemplary embodiment of the present invention.

FIG. 8 is a screenshot that illustrates the operation of an exemplary embodiment of the present invention.

FIG. 15A illustrates exemplary tables and FIGS. 15B and 15C illustrate exemplary screenshots of an exemplary embodiment of the present invention.

FIGS. 16A, 16B, 16C, and 16D are an illustration of exemplary text commands.

FIG. 18 is an illustration of an exemplary combination problem.

FIGS. 19A and 19B further illustrate exemplary combinations associated with a combination problem.

FIG. 22 illustrates an exemplary screenshot and output in accordance with an exemplary embodiment the present invention.

FIG. 23 illustrates mathematical computation of various numbers of combinations.

FIG. 24 illustrates varying numbers of combinations of data in accordance with an exemplary embodiment of the present invention.

FIG. 28 illustrates exemplary data that is useful for describing a further exemplary embodiment of the present invention.

FIG. 30 is a table that depicts how certain key fields are grouped together based on their names.

SUMMARY OF THE INVENTION

Figure 2A:
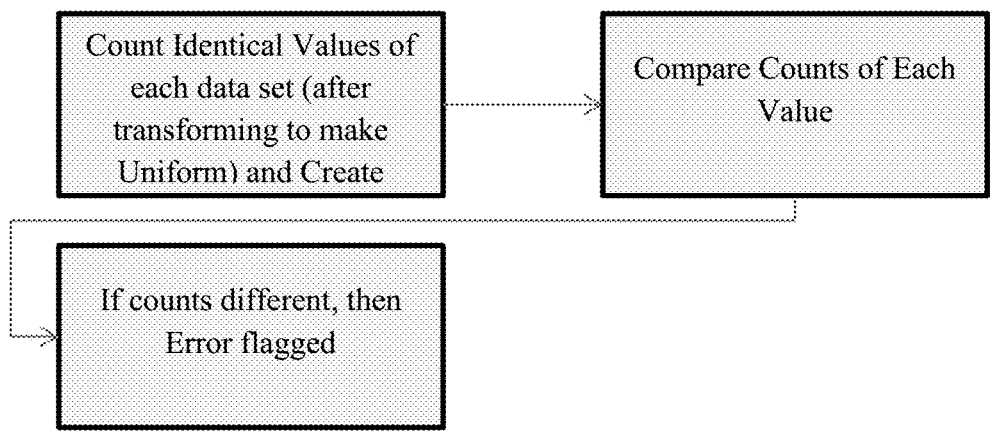
FIG. 2A is a flowchart diagram that illustrates operation of an exemplary embodiment of the present invention.

An apparatus and method displays an error between a first sequence of numbers and a second sequence of numbers. A plurality of respectively different algorithms are provided for comparing the first sequence of numbers and the second sequence of numbers. At least one of the algorithms is selected to compare the first sequence of numbers and the second sequence of numbers. The selected algorithm(s) are applied to the first sequence of numbers and the second sequence of numbers in order to identify the error, wherein the error is a discrepancy between one of the numbers in the first sequence and another of the numbers in the second sequence. The error is displayed by simultaneously displaying and indicating the numbers from each sequence that have the discrepancy. For at least one of the algorithms the numbers from each of the sequences have a matching associated label. At least one of the algorithms applies fuzzy matching to the numbers from each of the sequences. At least one of the algorithms adds the numbers from one of the sequences to obtain a partial addition sum and displays the partial addition sum with one of the numbers from the other sequence. For at least one of the algorithms the discrepancy is between non-identical positions within the two sequences.

DETAILED DESCRIPTION

In an exemplary embodiment of the present invention, two lists containing numbers and/or characters are compared. The purpose of the comparison can be to determine if elements of the two lists match. Alternatively, or in addition, for example, the two lists can be compared to determine if there is a discrepancy between the two lists.

As an example, and for illustrative purposes, one list can comprise various invoices that are sent to a customer. The $2^{nd}$ list can comprise various payments that are received from the customer. In an office environment, it may be desirable to compare the two lists to determine if all invoices have been correctly paid. Unfortunately, however, there are times when there may be errors such that discrepancies between the two lists. Assume, for example, that the $1^{st}$ list comprises three invoices and the $2^{nd}$ list is supposed to comprise three payments for the three invoices in the $1^{st}$ list. There may have been errors regarding the entry of this information. As one example, the $2^{nd}$ item in the $3^{rd}$ item on the $2^{nd}$ list may have been accidentally switched. As another example, the digits that comprise a specifically entered number may have been interposed (e. g. "27" may have been entered as "72").

As a further example, assume that the $1^{st}$ list comprises invoice amounts from respective invoices and the $2^{nd}$ list comprises payment amounts. Furthermore, assume that multiple invoices from the $1^{st}$ list are paid in a single payment. If the $1^{st}$ list includes two invoice amounts, $2 and $3, and the $2^{nd}$ list includes one payment of $5, it may be possible for a bookkeeper to determine that the $5 payment was in satisfaction of the $2 and $3 invoices. If, however, the $1^{st}$ list and the $2^{nd}$ list each include dozens of items, finding the correct combination between the invoices in the payment can become extremely burdensome.

In a further example, assume that the $1^{st}$ list and the $2^{nd}$ list include a corresponding item but the title of the item is not quite identical in the two lists. Assume for example, that the $1^{st}$ list shows a $5 invoice issued to Douglas, and the $2^{nd}$ list shows a $5 payment received from Doug. Again, if the two lists are sparsely populated, it may be possible for a bookkeeper to recognize that Doug and Douglas are, in fact, the same customer. If, however, the $1^{st}$ list and the $2^{nd}$ list are lengthy, identifying the corresponding item in the two lists can become extremely difficult.

These are merely examples of how it may be desirable to identify correlation between two lists (of numbers, for example).

The above examples are illustrative to help explain some of the problems that are solved by the present invention. The above examples have been tremendously simplified, however, for the purposes of explanation. In reality, when two lists (of numbers, for example) need to be compared, the lists often do not have two or three items as included in the above illustrations. Instead, the lists may have hundreds or thousands of items. Thus, for a bookkeeper to scan through such lengthy lists can be an exceptionally onerous task. One way for a bookkeeper to perform such a scan is print out pages and pages of lists and to manually examine all of the pages with pencil and paper in hand. With this methodology, when values in two columns are being compared, it may be necessary to scan all of the items in one column for each of the items in the other column. While this process is lengthy, the process may or may not be workable if there is an error in one column, the other column, or both columns. Thus, for example, if a comparison between two items in respective columns is desired, and the characters associated with the two items are not exact (i.e. characters interposed, wrongly typed in, missing, etc.) such a painstaking search can be conducted with a bookkeeper completing the search and not finding the corresponding items in the two columns. In such a situation, a painstaking search is conducted and the desired comparison between items in two columns does not occur.

Thus, one of the difficulties identified by the inventor is that a list that is being evaluated may include hundreds or thousands of items. Current display technology can impose severe limitations on the ability to review multiple items on that list. Assume, for example, that a user needs to view all the items on the list that has thousands of items. With current display technology, displaying all those items simultaneously could be difficult if not impossible because computer screens are simply not large enough so that thousands of items can be legibly displayed. Thus, the inventor has created technology so that a subset of a list of items can be displayed for rapid comparison between two lists of items (and/or between two items on two respective lists of items).

The present invention thus relies on technology in order to help to find correlations and/or discrepancies between two lists. In particular, one or more visual displays are used in a manner that enables comparison between items included in two lists so that the two items can be easily compared. By using the display in a particular manner exemplified by the present invention, various advantages are obtained. In particular, the user is spared from an excessive amount of time trying to manually compare such lists. There are technical advantages achieved as well. For a user to interact with a computer device in order to manually scan such lists may result in not only an excessive amount of processor use, but also an extreme amount of memory access in order to retrieve information so that manual comparison may be accomplished. Furthermore, if multiple screens need to be viewed to perform a manual scan, the process may be so cumbersome as to be ineffective. When scrolling through multiple screens, probability of error, or simply "missing" information as it scrolls by is increased. Thus, because of the manner in which a display device is used and information is displayed on a screen in accordance with the present invention, improved computer processor utilization as well as more efficient memory access is achieved.

In one exemplary embodiment of the present invention the display technology may obscure (or partially obscure) the perfectly matching information so the user can easily focus on resolving discrepancies. In another exemplary embodiment, while the perfectly matching information is not obscured, it is displayed in a manner differently than non-matching information. Again, without the present invention, an alternative is for users to print out pages and pages of data and visually scan for errors, often with a calculator by their side, to sum multiple items to compare to other sums.

To put it another way, without the manner in which information is displayed on a screen in accordance with the present invention, the ability to identify correspondence and/or discrepancies between items on two (or more) lists may be significantly more difficult. Thus, screen technology is being used in combination with the ability to use one or more of multiple algorithms in order to rapidly and efficiently enable correspondence and or discrepancy between two lists to be identified.

Thus, the invention is more than simply displaying two lists of items on a screen. Rather, technology is being used so that items from two different lists can be identified and subsequently displayed in a manner so that rapid comparison between the two lists (and items thereon) may be accomplished.

In one exemplary embodiment, an item from a first sequence and an item from a second sequence are displayed simultaneously and identified as including a discrepancy if the two items should be equal but are not. In one exemplary embodiment, the item from the first sequence and the item from the second sequence are displayed simultaneously responsive to interaction with a display device. The interaction can include, for example, the use of a mouse to click and/or hover over certain areas of the display in order convey to a computer processor that the item from the first sequence and the item from the second sequence are to be displayed simultaneously while at the same time identified as part of a "pair" that have been identified as corresponding, but including an error. In a further exemplary embodiment, while the "pair" have been identified, other items from the first and second sequence are either displayed in a manner so that it is apparent that they are not part of that pair, or they are obscured (or prevented from being displayed). In another exemplary embodiment, the items from the first and second list are displayed simultaneously, along with other items that were included in the first sequence and the second sequence, wherein the respective items from each sequence should be equal, and no discrepancy is identified.

Thus, in one exemplary embodiment of the present invention, multiple items from the first list and multiple items from the second list are displayed simultaneously, wherein one of the items on the first list and one of the items on the second list have a discrepancy between them, and other displayed items from the first list and other displayed items from the second list do not have discrepancies between them (and are displayed anyway).

To help illustrate the problem, it is useful to consider how many combinations of items may be compiled based on a list of multiple items. Consider a deck of 3 cards (Cards A, B and C). If two cards are dealt from the deck, then 3 combinations if the two dealt cards are possible (AB, AC and BC).

Assume instead, however, that a real deck with 52 cards is used. The number of combinations is based on well-known permutation and combination formula:

$$\frac{n!}{r!(n-r)!}$$

An example that should make this clearer would be to consider a deck of 52 cards (n=52). If 5 cards are dealt (r=5), there are 52!/5!(52-5)!. That reduces to 52*51*50*49*48/1*2*3*4*5. That means there are 2,598,960 combinations. See FIG. 24.

In this function n stays constant, but r starts at 1 and then goes to 40. The value returned is cumulative.

Accordingly, a function maxcombos may be used to calculate the maximum number of combinations that me obtained from a list of items. Function maxcombos has two parameters that are input into the function. The first parameter is the number of numbers to evaluate. The second parameter is the maximum number to evaluate. It cycles through the number of combinations using a widely known formula.

The function returns the number of combinations that can be evaluated within the physical capabilities of the computer system. If the system has speed or memory limitations, the function will return the maximum number of combinations within those limitations. Again, FIG. 24 illustrates the use of this function.

FIG. 2 shows system and method for cycling through data to count number of values that are expected to be identical. Then the expected identical values are compared. When there is a discrepancy, it is flagged.

Step 1:

Loop through data set 1 (first sequence of numbers) and count all occurrences of each number or text.

Loop through data set 2 (second sequence of numbers) and count all occurrences of each number or text.

Figures 3A, 3B:
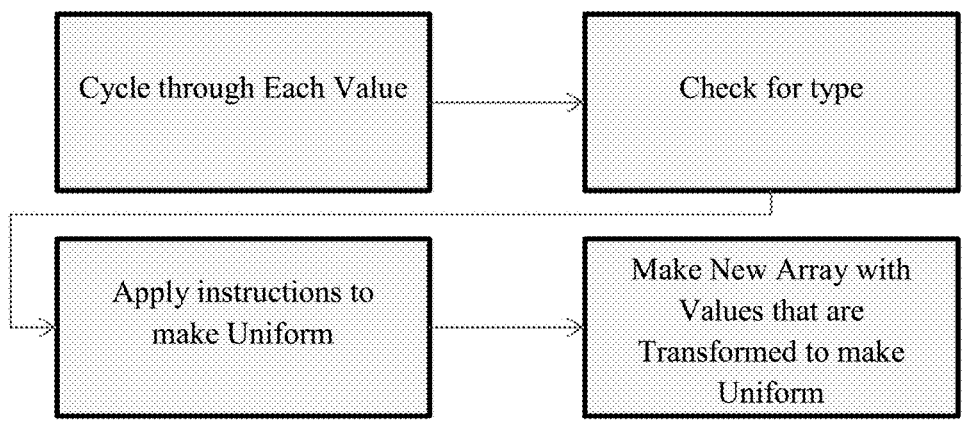
FIG. 3A is a flowchart diagram that illustrates operation of an exemplary embodiment of the present invention.
FIG. 3B is a screenshot that illustrates the operation of the exemplary embodiment illustrated in FIG. 3A.

The process to transform data to make uniform is illustrated in FIG. 3A and FIG. 3B.

Create an array of unique values and counts for set 1 and set 2 . . . called Unique Arrays.

Step 2:

Loop through the Unique Arrays looking for values where the counts are different on each side. This is accomplished by comparing the counts and identifying when a difference is found. The algorithm that may be used to perform this operation may be a "brute force" algorithm, in other words, compare the first item on a first list with each of the items on the second list, compare the second item on the first list with each of the items on the second list, etc.

One exemplary improvement to the brute force approach which scans every combination, which can be called a heuristic, is that the software eliminates outliers that would make the combination impossible. For example, if the software is aware that the invoice is $10,000 and there $1,000, $8,000, $2,000, and $12,000 payments, then the software will remove the $12,000 from the possible list of combinations, thereby reducing the number of combinations. Removing outliers can greatly speed the calculations, especially when there are many outliers.

Another exemplary heuristic, which speeds the brute force approach is to use date filters to limit the possible number of combinations. For example, if an invoice is dated Mar. 31, 2016 and the user knows that 99% of bills are paid within 60 days, then the user can impose a cutoff of 60 days, until May 31, 2016, to capture all possible payments that would be applied to the Mar. 31, 2016 invoice. Similarly, if the user knows that there are never more than 10 partial payments against an invoice, then the user can limit the possible payments to the first 10 unapplied payments.

These heuristics greatly speed the calculations. Instead of billions or even trillions of combinations (as would exist with 100 invoices and 200 payments), the user can assess fewer combinations at a time. To be clear, even modern office computers may require days or even weeks or years to calculate trillions of calculations.

Step 3:

Highlight these differences for users. Highlighting of the differences is done through the use of a display. In particular, the items having the differences are displayed in a manner so that they are both displayed simultaneously. In addition, they are displayed in a manner so that the two items are identified as being two items (out of all of the items that appear—or previously appeared—on the display) that have a discrepancy between them. Thus, the display is not merely a generic computer display. Rather, a processor is controlling the display so that the display is readily enabling efficient identification of one or more discrepancies within two sequences of items (e.g. numbers).

Figure 2B:
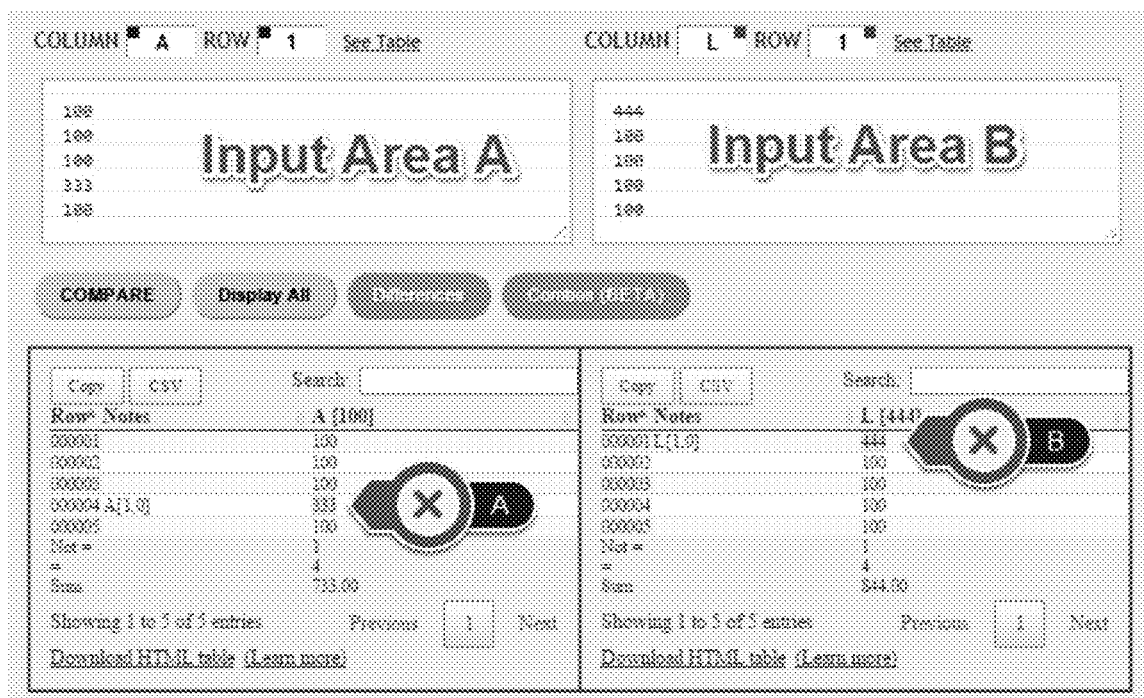
FIG. 2B is a screenshot that illustrates the operation of the exemplary embodiment illustrated in FIG. 2A.

FIG. 2A and FIG. 2B include a screenshot based on the above exemplary steps. As shown, the user enters data in Input Areas A and B. Flagged item A shows there is 1 value of 333 in Area A and nothing in Area B. Flagged item B shows there is 1 value of 444 in Area B and nothing in Area A. This discrepancy is flagged. Thus, the discrepancy from each list is flagged on a display. Through the use of flagging these values on a display, a user is able to quickly identify a discrepancy between the 1$^{st}$ list and the 2$^{nd}$ list. Plus, technology has effectively been used in order to identify discrepancy between two lists. As will be understood by one of ordinary skill the art, if these two lists included hundreds or thousands of items, identifying the discrepancy between the two lists would be onerous. The use of the flags in combination with the display enables the discrepancy to be readily identified.

FIG. 3A and FIG. 3B illustrate an exemplary embodiment of the present invention in which data is normalized prior to the performance of a comparison. As shown, a computer processor is able to cycle through each value to determine if a transformation is needed. This step is desirable if two data items have the same content, but are simply formatted differently. For example, if it is determined that a value is a date, it is standardized to a single format. Similarly, if a user specifies that all text should be compared without case sensitivity, then all lower case is transformed to upper case. There are other transformations, such as positive numbers could be transformed to negative. Another transformation shown in this Figure is that all punctuation is removed so that douglas is identical to doug,las (note check marks on Figure). The algorithm to perform this function can be, for example, a series of conditions that are tested for and subsequent replacement/rearrangement based on the identified condition.

Another transformation is that data that does not match exactly is tested for transpositions. One exemplary algorithm includes the step of sorting every character alphabetically. If the sorted values match, then it is assumed to be a transposition. In the figure, the values marked with an exclamation mark are 991 and 199. The system flags these as possible transpositions with a T. Another transposition that is flagged is when the month and date on two different dates are identical but the year is one year off.

Another transformation (algorithm) is that certain text can be forced to be removed and substituted with a formula. For example, some data is formatted as 10,000 CR. This means that it is a 10,000 credit, which really means (10,000) or negative 10,000. The system will automatically transform CR to negative one times the value if this option is selected. Many other transformations are possible.

Figures 4A, 4B:
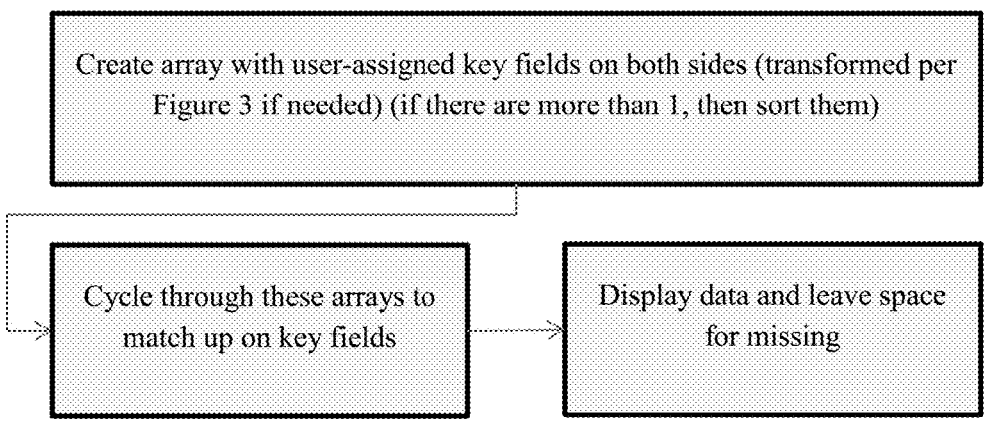
FIG. 4A is a flowchart diagram that illustrates operation of an exemplary embodiment of the present invention.
FIG. 4B is a screenshot that illustrates the operation of the exemplary embodiment illustrated in FIG. 4A.

FIG. 4A and FIG. 4B illustrate an exemplary embodiment of the present invention in which items into columns are matched based on key value (matching associated label). The data is lined up according to one or more key fields in a manner that is very flexible. An example of a single key field would be Last Name. The software can match the data based on the Last Name. Sometimes multiple key fields are preferred, so that the data is more unique. For example, it could be First Name and Last Name. Or even more unique could be First Name, Last Name, and zip code. Another example would be an account number. Presumably an account number would be sufficient to match both sides.

Key values may be numbers, letters, and/or other symbols.

The key fields do not have to be matched one to one. Multiple key fields can be used as described more fully in FIG. 5. The key fields can also be transformed per FIG. 3A and FIG. 3B.

In FIG. 3A and FIG. 3B, it shown that Brian is unique in Area A (first sequence of numbers) and Ben is Unique in Area B (second sequence of numbers). It is also shown that keys can be selected with radio buttons.

Computer programmers will solve the problem of "Cycle through these arrays to match up on key fields" in various alternative manners as is known to one of ordinary skill in the art. In one exemplary embodiment of the present invention, such cycling may be handled with an algorithm as follows. All of the key fields on both sides are added to an array or unique key fields. Before they are added, they are transformed and, if multiple fields, sorted per FIGS. 5A, 5B, and 5C. Before they are added to the array, they are checked to make sure they are not pre-existing, and therefore unique. This array of unique keys may be referred to as "rowpairsArr".

Then the software cycles through each set of data (for example, in a brute force manner). The unique key is then calculated for each row. The row number is then added to the data assigned in rowpairsArr. In FIG. 4, there are 6 unique keys (for example). For example, rowpairsArr begins has 6 elements. They are Ben, Bill, Brian, Doug, Henry, and James. They are sorted alphabetically. The data is then further populated with row data. For example, the fourth element in array rowpairsArr is ["Doug", [3], [4] ]. The [3] in the data means the third row on the left side of FIG. 4A and FIG. 4B. If there were two Doug's on the left side, it would be [3 (again assuming that "Doug" is in row 3), X (the other row in which "Doug" appears)]. On right side of FIG. 4A and FIG. 4B, there is a "Doug" in the fourth row.

rowpairsArr, in summary, is a map of the key fields in the data. There are other ways to create this map—what is illustrated is merely exemplary. Once a map is created, it can be filtered in many ways. One filter could be to show data that is only the left and nothing on the right. To do this, only items in rowpairsArr with this structure could be shown: ["Key Data", [some elements], [ ] ]. In this case, it would show data that has no rows on the right. Another filter would be data that has the same number of rows on the right and the left.

Figures 5A, 5B:
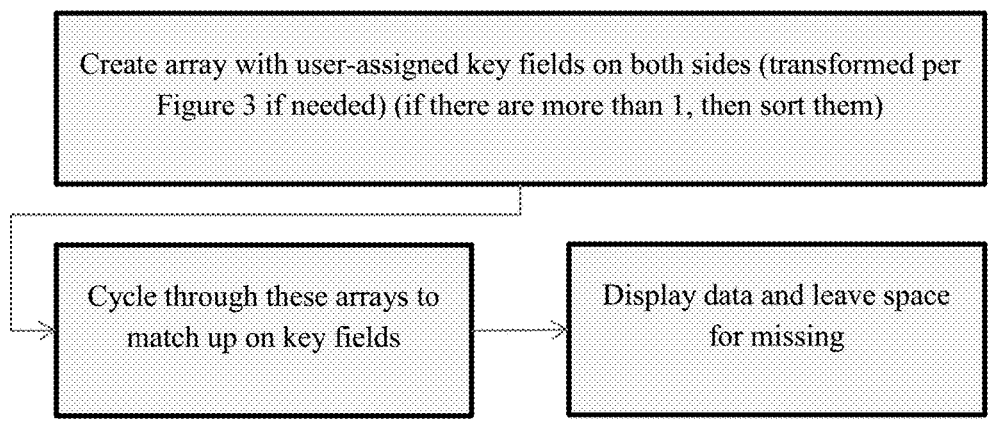
Figure 5C:
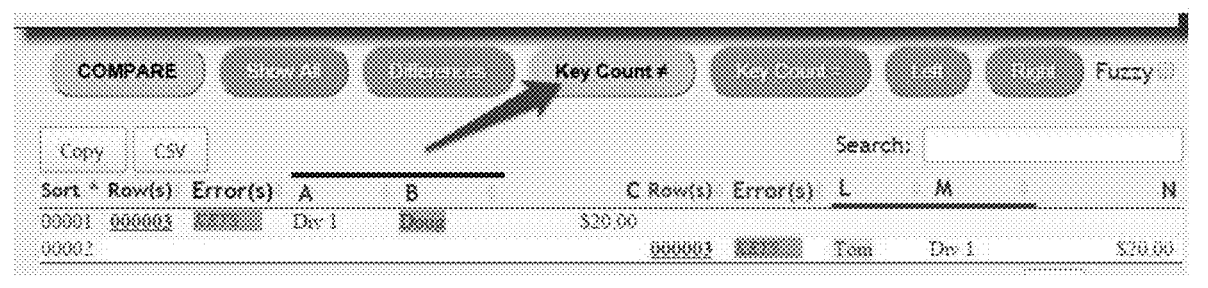

FIGS. 5A, 5B, and 5C illustrate an exemplary embodiment of the present invention in which multiple key columns (included with a first sequence of numbers and a second sequence of numbers) are matched. The first step of an algorithm to perform this feature is to create an array of unique key fields for each side. The values are first transformed per FIGS. 3A and 3B. Then, because there are multiple key columns, and because they do not have to be specified in order, the columns are sorted. In the FIGS. 5A, 5B, and 5C, the first column on the left side is the Div and the second is a name. On the right side, the order of the first two columns shown on the left side is reversed. Because of the sorting that described below, the order is not important. In other words, users do not have line up columns perfectly. It is automatically lined up.

In the case of the example of FIGS. 5A, 5B, and 5C, 1 and Doug are put into the array as "Div1, Doug". However, the keys, Div 1 and Bill, are put into the array as "Bill, Div 1". Then the rows are matched by these concatenated and sorted key field data.

In the screenshot, on the left side (the A side), there is a Div 1, Doug and a Div 2, Doug. On the right side, there is only a Div 2, Doug. But on the right side, there is also a Div 1, Tom When there is a lot of data, it is not easy to rely only on the blank spaces or color codes to show the differences. Consequently, there is a button that is labeled "Key Count ≠". When that button is pressed, only the rows that have a different count are displayed. That is also shown in the Figure.

Figure 6:
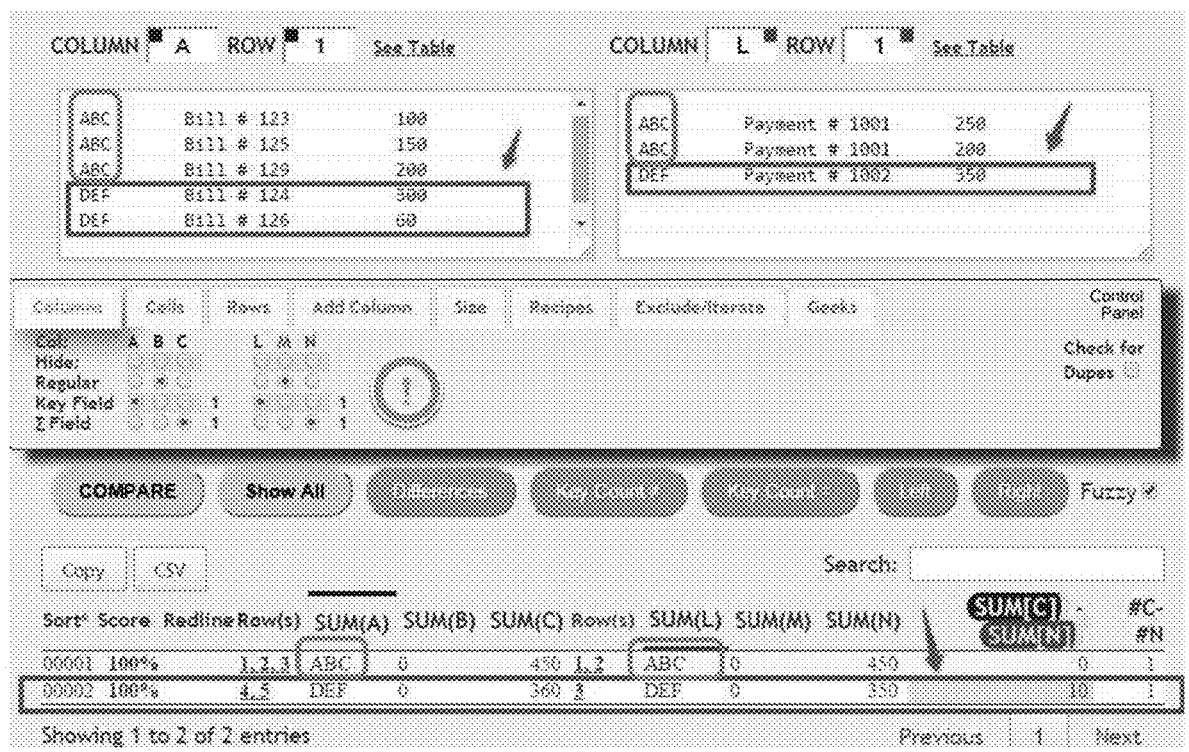
FIG. 6 is a screenshot that illustrates the operation of an exemplary embodiment of the present invention.

FIG. 6 illustrates an exemplary embodiment of the present invention in which an algorithm is described that enables columns to be matched as items are added. This Figure is very similar to previous Figures except that a summation column is added and compared. On the Figure, ABC's bills on the left (first sequence of numbers) are summed. It totals 450. ABC's payments on the right sum to 450 (second sequence of numbers). Similarly DEF is summed to 360 on the left and 350 on the right. The difference of 10 is noted clearly.

The same rowpairsArr array variable mentioned in FIGS. 5A, 5B, and 5C is modified such that two additional summation values are added. A programmer skilled in the art could cycle through the rows to sum the values. The rowpairsArr for "DEF" would be ["DEF", [4,5], [3], 360, 350 ]. This array can be filtered to only show desired results.

The exclamation point on the Figures shows how the fields are designated as key fields or summation fields. There are multiple ways to allow the user to set the fields that will be elaborated on further in this document.

FIG. 7 illustrates an exemplary embodiment of the present invention which relates to an algorithm in which a check for duplicates occurs. The same techniques described above with respect to multiple key column (FIGS. 5A, 5B, and 5C) can be used to identify duplicates (including a brute force approach). In FIG. 7 four records on the left (first sequence) with two zip codes (10000 and 20000) and two different customer names (AAA and BBB). FIG. 7 shows two records on the right (second sequence), one for zip code 10000 and customer AAA and one for zip code 30000 and customer AAA.

FIG. 7 has an exclamation point which designates the area where the user can designate that both columns are selected as key fields on both sides.

The same rowpairsArr array variable is used to map the structure of the database and then to identify key fields. The rowpairsArr map is shown in FIG. 7.

With the rowpairsArr array variable, it is then possible to create filters to show the entire results as shown in the Figure. Alternative, a filter can be created that will show only new items, or only unique items, or only duplicated items.

Figure 8:
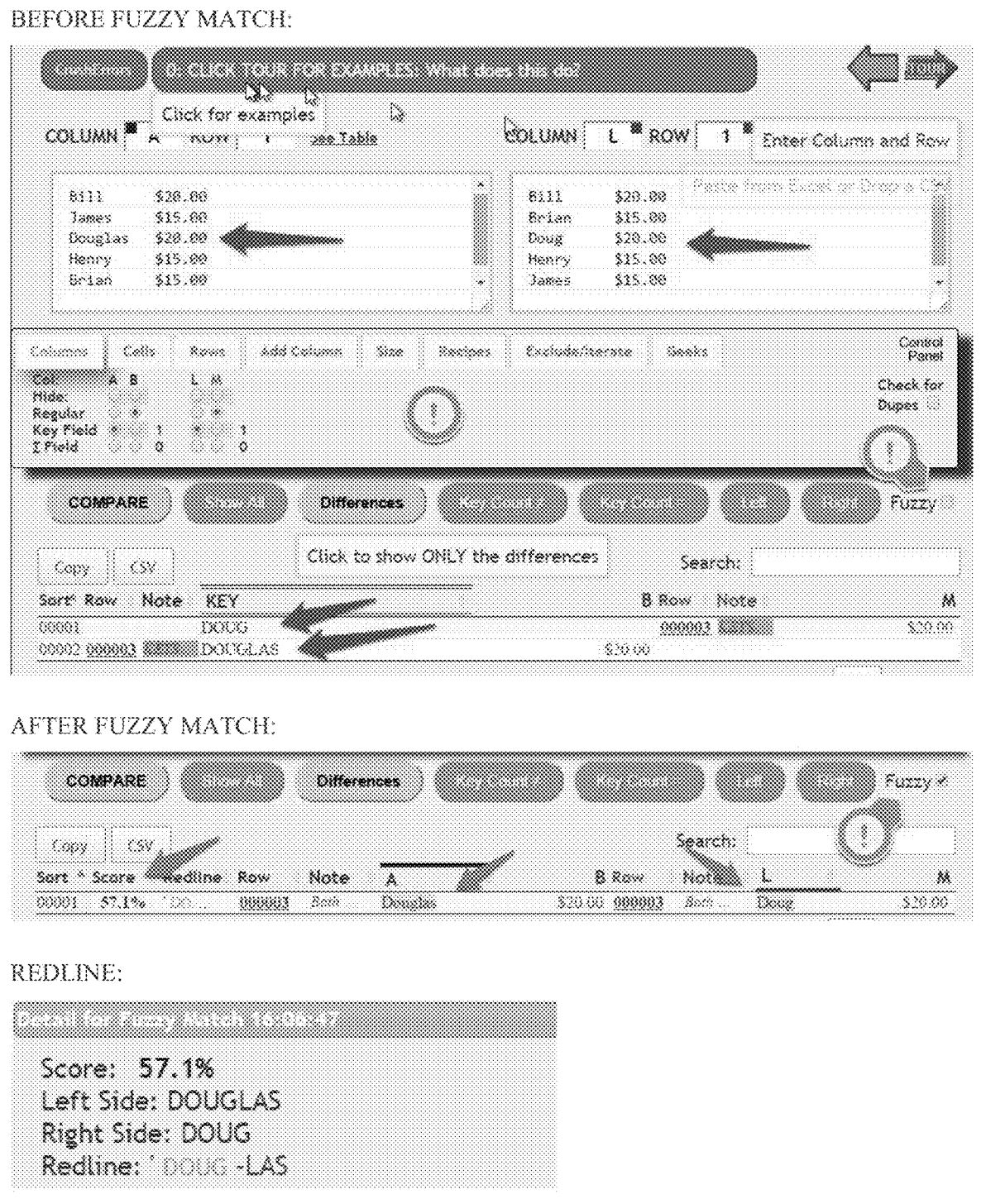

FIG. 8 illustrates an exemplary embodiment in which fuzzy matching is used. An example of fuzzy matching is to use an algorithm that calculates the Levenshtein Distance (LD) between two sets of text (see FIG. 9). Use of this algorithm is merely exemplary. For example, the LD when comparing Doug and Douglas is 57%. This technology has been applied to this exemplary embodiment so that key fields can be matched with similar but not identical key fields. This technology can be applied to matching one or more key columns as well as comparing the sum of matched items as well as identifying duplicates (see FIG. 7.).

FIG. 8 has screenshots that show how the Fuzzy matching works in practice. The users have two sets of data (first and second sequence). They are nearly identical except that one column has a name Douglas and the other has Doug. This might be to match using typical technology because it is not identical. The screenshot labeled "BEFORE FUZZY MATCH" shows Doug and Douglas on separate lines. The screenshot labeled "AFTER FUZZY MATCH" shows Doug and Douglas on the same line with a score of 57.1% to show that it's not perfect. A score provides power to the user to determine if Doug is indeed the same as Douglas. If there were thousands of near matches to review, the user could focus on matches that are scored between 50% and 80%, for example, under the assumption that above 80% is almost certainly a direct match, but less than 50% is unlikely. In real-world situations, the value of the score depends on the general nature of the text. Sometimes one set of text could have numbers appended (like an account number) that reduces the accuracy of the score.

Figure 9:
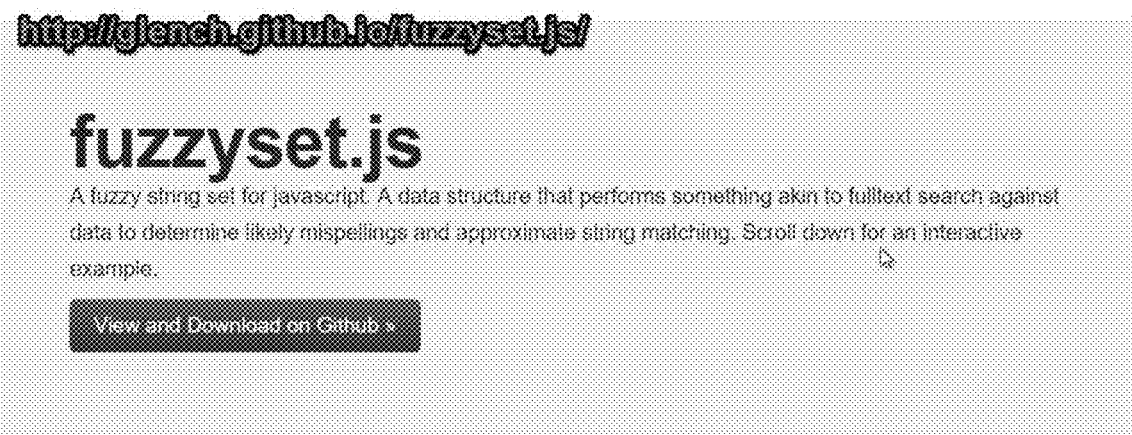
FIG. 9 is an exemplary screenshot of a web page that may be used for access to fuzzy matching software.

FIG. 9 is an example of how software for performing the LD algorithm can be downloaded and utilized as part of this embodiment. Other similar technologies are also available and known to one of ordinary skill in the art. An exemplary algorithm may be used to find the best matches in any key field. A value is tested against a set of data. The fuzzyset.js algorithm will return the best match and rate it. For an exact match, the rating would be 100%. If there is a small discrepancy it would be 99%. Typically, 99% is not returned because there is usually less than 100 characters with ONE error. That would be 99%. In one example, if there are 20 characters with 1 error, the algorithm would return a value of 95%. The value returned depends on the nature of the error. This general description of the LD algorithm is being provided for background information only.

Figure 10:
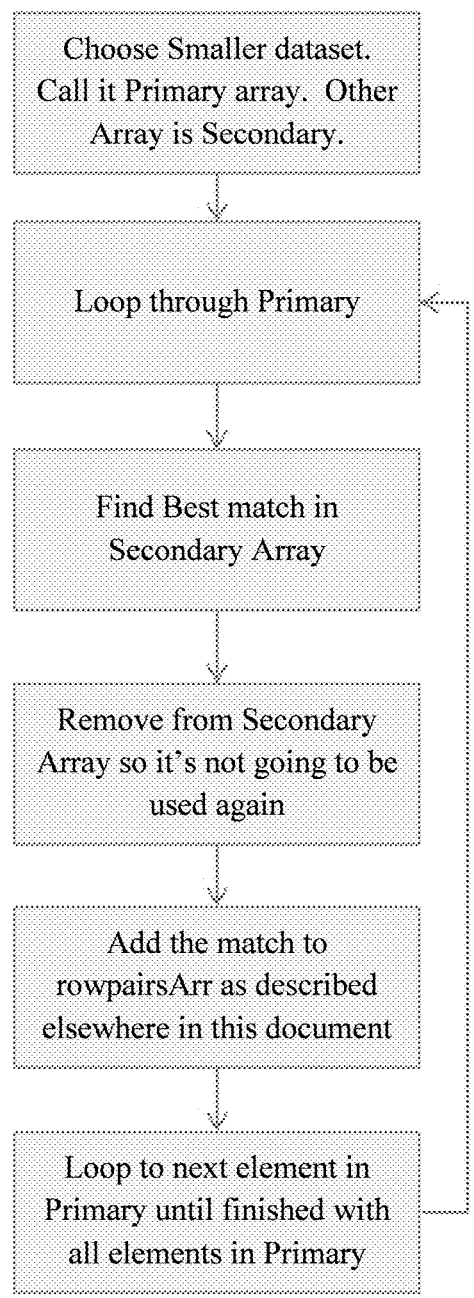
FIG. 10 is a flowchart of an exemplary embodiment of the present invention.

FIG. 10 provides an example using fuzzy methodology. First all of the perfect matches are identified and only the remaining items are evaluated as described in other areas of this document. There are two ways identify matches. One method is slower but more precise than the other. The Methodology in the Figure is faster because if it scrolls through one array (or fewer than all of the arrays) at a time.

Figure 11:
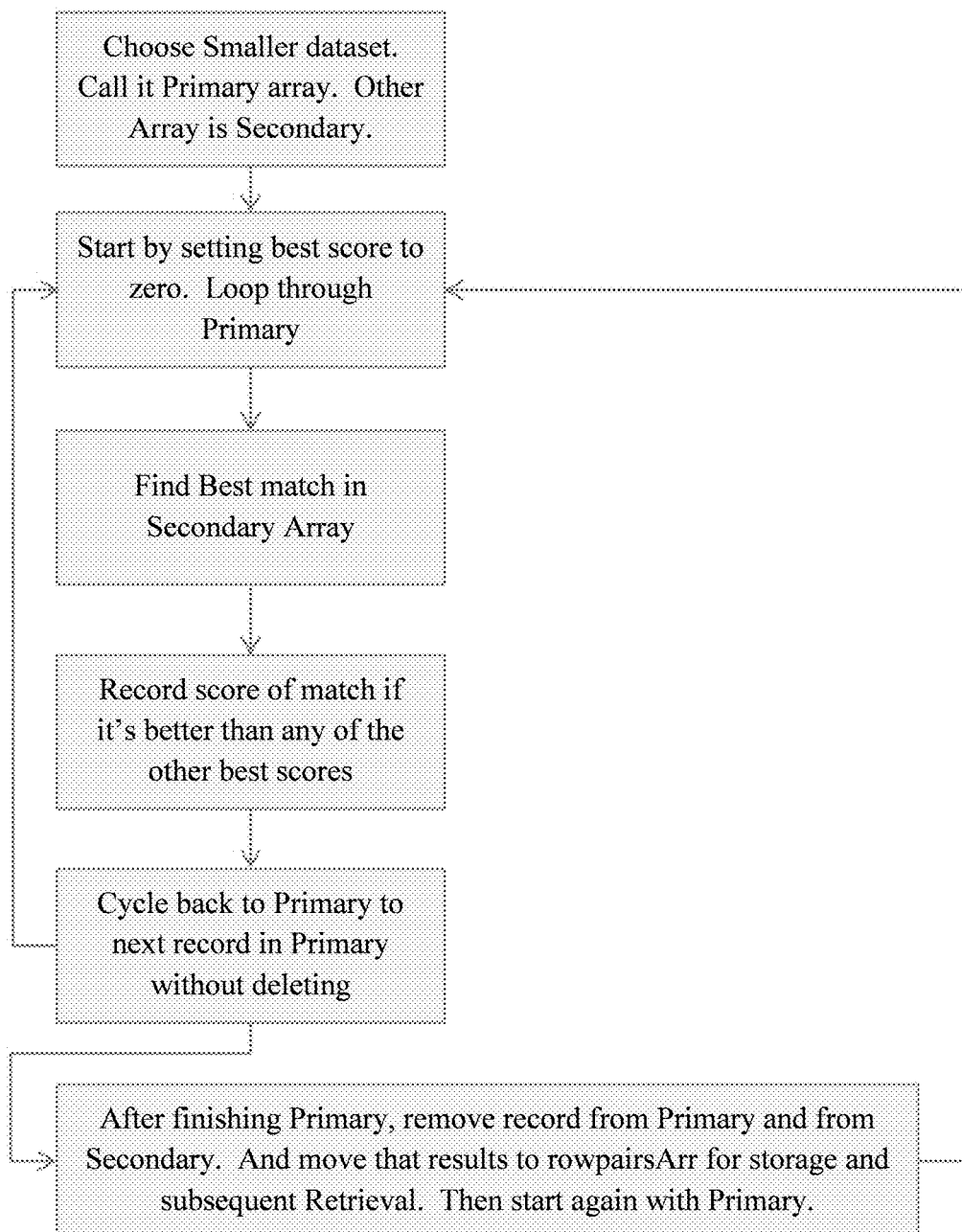
FIG. 11 is a flowchart of an exemplary embodiment of the present invention.

FIG. 11 provides a further example using fuzzy methodology. This methodology is slower because it cycles repeatedly through the datasets until the best match is found. One advantage of Method 2 is that it finds the very best match and then the second very best match, etc. But this method can be very slow for big data sets. Over time, with better algorithms and better processors, this could become very fast even for 100,000's of records.

Figures 12A, 12B:
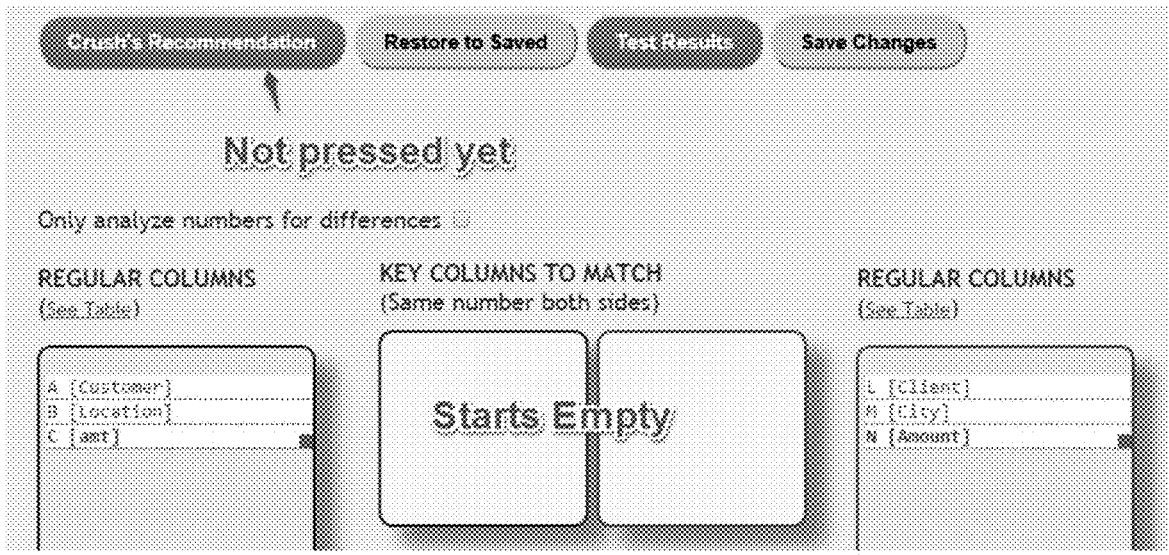
FIG. 12A illustrates exemplary tables and FIGS. 12B and 12C illustrate an exemplary screenshot of an exemplary embodiment of the present invention.
Figure 12C:
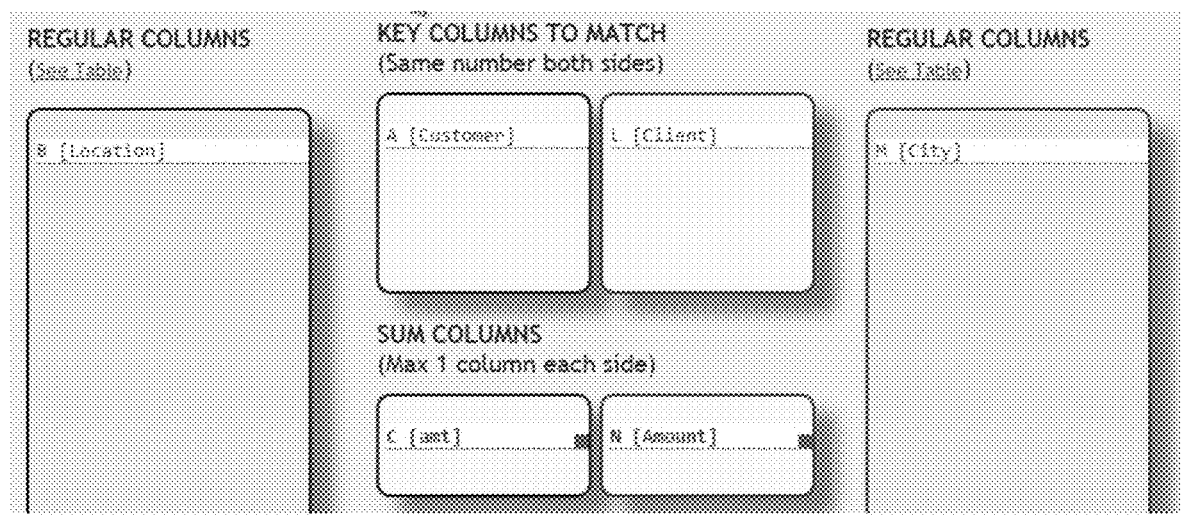

FIGS. 12A, 12B, and 12C illustrate exemplary screenshots for a setup wizard. The categorization of fields can be daunting for a new user. Consequently, there is a setup wizard that has some artificial intelligence that makes it easier. Users can also override the suggestions made by the wizard with a drag and drop interface. There is also a radio button interface (see exclamation point in FIGS. 4A and 4B) to designate fields and a text command method as well (see FIGS. 15A, 15B, and 15C), but the drag and drop is the easiest to understand.

The top portion of FIGS. 12A, 12B, and 12C shows two sets of data. One is labeled left and other is labeled right. The left headers are Customer, Location, and Net and the right headers are Client, City, and Amount. The system scans the data to determine that there are headers. See FIG. 13.

There is another level of scanning to determine that the first column is textual and the second column is numeric.

The first screenshot shows how the setup wizard initially evaluates the data. The numeric columns are color coded and have a small colored item to indicate it is a numeric field. But the fields are all placed in the section designated as a regular field. There is a button called "Crush's Recommendation" at the top of this second screenshot.

There the second screenshot shows what the Setup Wizard looks like after the "Crush's Recommendation" button is pressed.

Figure 14:
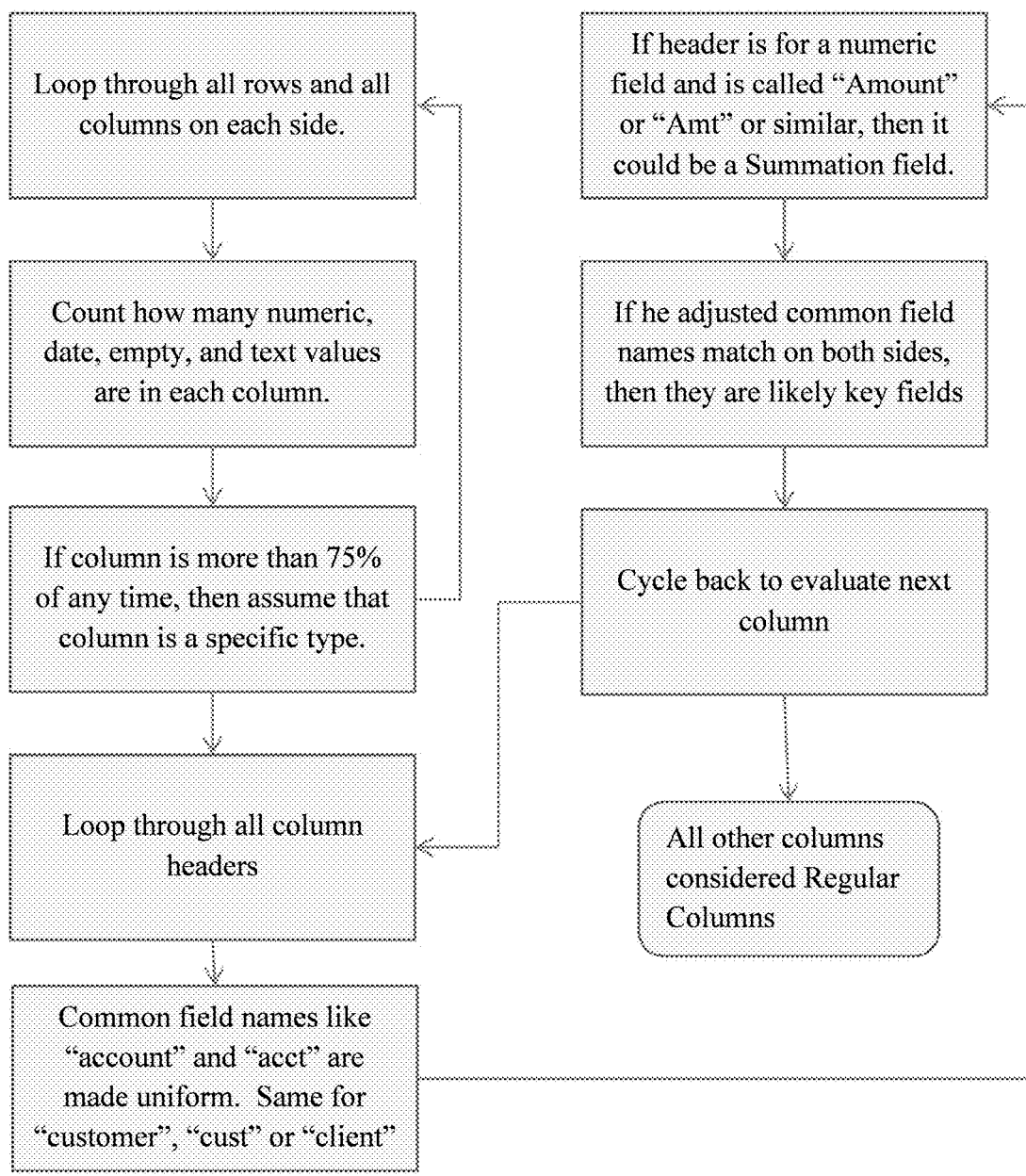
FIG. 14 is a flowchart of an exemplary embodiment of the present invention.

The recommendation button puts the fields into recommended categories, but the user can override these recommendations. Users often have different field names to essentially describe the same data. For example, "Customer" and "Client" are often used interchangeably. Another example would be "Amount" and "Amt". The word "Amount" could also be used interchangeably with "Net", "Net Amount", "Value", or "Net Value". The system will cycle through the field headers to identify substitutes for common terms so that they can be matched. For example, if the left set of data uses the word "Amount" but the right set of data uses "Amt", then the system will match "Amt" with "Amount" even though they are spelled differently. A table of word substitutes is shown in FIG. 14 Categorize Fields.

Furthermore, the system is coded to suggest that a field with the header of "Amount" or one of its substitutes is probably a Summation field. Consequently, a rule is coded that will recommend a column go into the Summation category if it is (A) the word "Amount" or one of its substitutes on the left side, (B) there is an equivalent field on the right side, and (C) both fields (A) and (B) are populated by data that is more than 75% numeric.

Above, key fields and sum fields are disclosed, but there also may be hidden fields. When a user copies data into Crush by pasting it or importing another way, there are often extraneous columns of data. These should be hidden as they are not important to evaluating results. The remaining fields are called regular fields. They are not summed, hidden, and they're not keys.

Fields that are mostly empty are automatically considered to be hidden fields. Fields can be empty when certain types of software, like QuickBooks creates output that have empty columns in between data columns.

Figure 13:
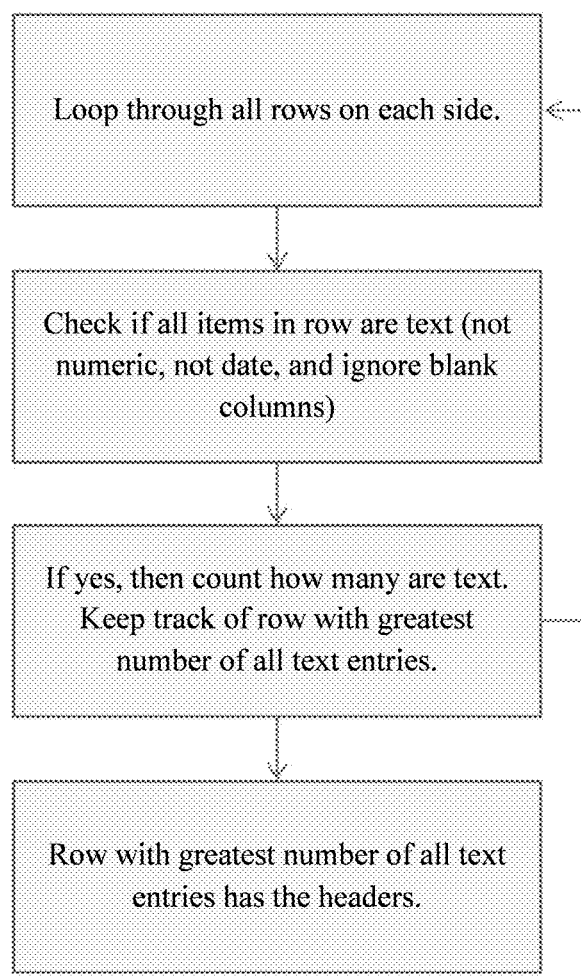
FIG. 13 is a flowchart of an exemplary embodiment of the present invention.

FIG. 13 illustrates an exemplary embodiment that includes the identifying of header row. Thus, a user does not have to specify header rows. In some cases, there are no headers and in an exemplary embodiment this discerned. FIG. 13 illustrates a methodology for identifying header rows.

FIG. 14 illustrates the use of categorize fields. After data is available to analysis in accordance with an exemplary embodiment of the present invention, the first 1000 records (for example) are scanned to try to use some artificial intelligence to see what kind of fields they are. (For purposes of this explanation, the term Fields and Columns have the same meaning. They both refer to the columns in the table which is the same as the fields in the data.) In an exemplary embodiment of the present invention, identification is performed of numeric fields, date fields, and text fields. The data may be mixed, so it has a benchmark of 75% (for example) to make the determination. If more than 75% of the data is numeric (for example), then it is assumed the whole column is numeric. A counter is maintained for each column to calculate how many of each type of data is in each field. Each one of the first 1000 rows increment the counter accordingly. For example, if the third column is numeric, then the numeric counter variable for the third column is incremented by one.

Initially, each column, by default, is assumed to be a Regular column. After looping through all rows, counting the type of content for each column and row, each column is designated either as text, date, numeric, hidden, or, if not, remains as a Regular column.

All blank columns are categorized as hidden. There are often blank columns because certain products generate reports with blank columns. Once they are categorized as hidden, they cannot be categorized as key or summation.

Then the field names are evaluated. If the field names are one of the Alternatives in the table immediately below, the Primary name is substituted internally. The user does not see Primary name. The purpose of this is to normalize the Field names for determining if the system can recommend a summation field or a key field.

The system will recommend that a field be categorized as a summation field when (A) the field is numeric and (B) the Primary name of the field is "amount" on both sides.

Fields are considered to be Key fields when they are the same on both sides (post reclassification per the Primary/Alternative table shown below). So, for example, if both sides have "acctnum" as one of their fields, they are recommended as key fields. To be extra clear, if one side has "account" and the other has "acct", they will be matched up because "acct" is an alternative form of "account" per the table below.

FIG. 30 also shows how certain fields are grouped together based on their names, and which includes a list of some of these groupings.

Figure 15C:
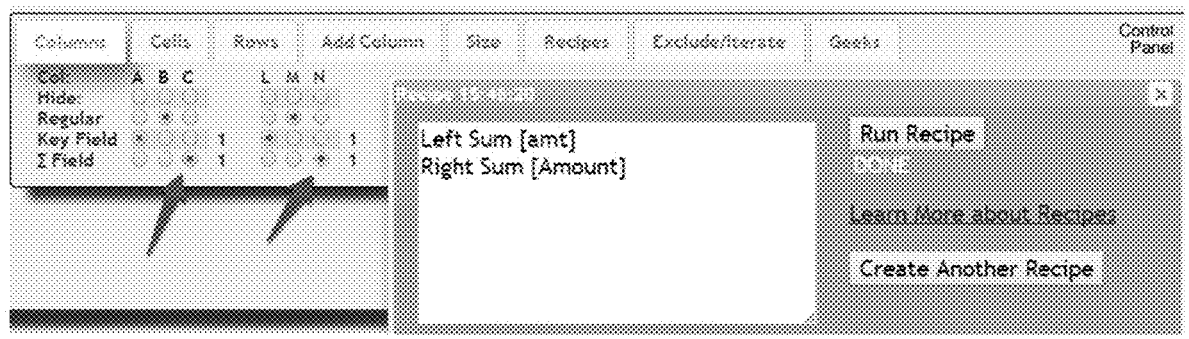

FIGS. 15A, 15B, and 15C illustrate the use of screen shots of text commands in accordance with an exemplary embodiment of the present invention. Text commands, or Recipes as they called in the system or method, are another user interface to designate column types. It supplements the setup wizard and the radio buttons. In some cases, a user could be expected to repeat the same activity over and over. For example, a data set may require reconciliation on a monthly basis. The user can save the settings, such as make column "A" a key field so it doesn't have to be repeated. These settings could get complicated. Actually setting up the system to find the errors could have errors. So to avoid the errors, there is a way to enter a complete set of instructions to set up an embodiment of the invention so that the same way every time to find the errors.

Section 1 on the Figure has the data. It is the same data that is used on FIGS. 12A, 12B, and 12C.

Section 2 on the Figure shows that these two text commands "Left show all" and "Right show all" will force all of the fields to the category of Regular.

Section 3 on the Figure shows that these two text commands "Left Key [Customer]" and "Right Key [Client]" will force those columns into the category of a Key column.

Section 4 on the Figure shows that these two text commands "Left Sum [amt]" and "Right Sum [Amount]" will force those columns into the category of a Sum column.

FIGS. 16A, 16B, 16C, and 16D are a list of text commands in accordance with an exemplary embodiment of the present invention. FIGS. 16A, 16B, 16C, and 16D have a list of textual instructions to set up a session to attempt to find errors and discrepancies.

Figure 17:
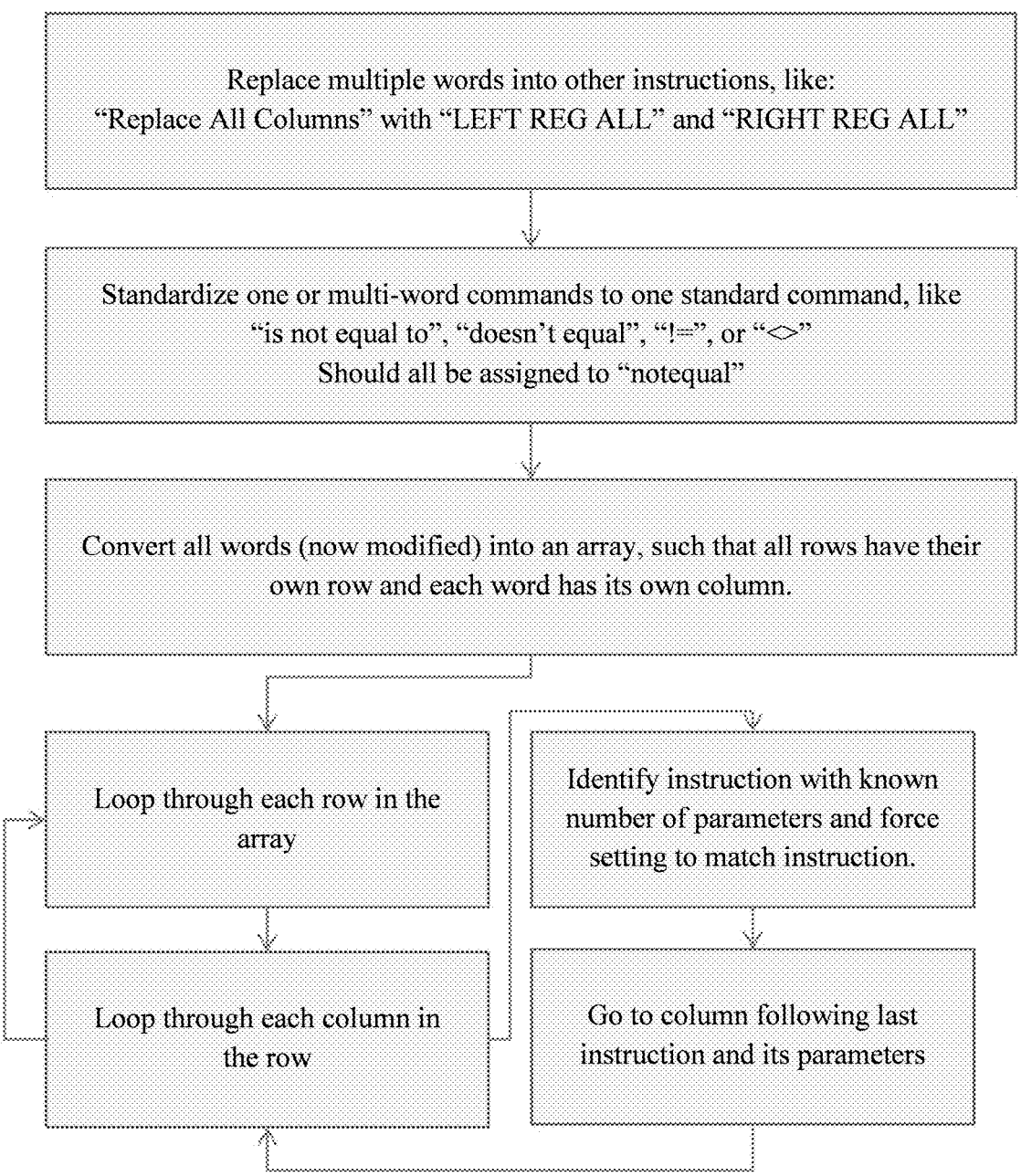
FIG. 17 is a flowchart of an exemplary embodiment of the present invention.

FIG. 17 illustrates how to program text commands in accordance with an exemplary embodiment of the present invention. Implementation may be programmatically time consuming because it attempts to implement a natural language commands. Nevertheless, it does not require programming brilliance. The Figure shows exemplary steps to program text commands with a natural language interface.

FIG. 18 illustrates an exemplary combinations problem. Assume a company sends out many invoices. Assume that customers make partial payments instead of full payments. Assume a company records several bills from a vendor and makes one payment to pay several bills.

In both of these situations, a bookkeeper may have a hard time matching the payment with the many bills or the deposit with many invoices.

A real world example is shown in this Figure. There are 22 bills and 1 payment. How does one figure out which bills match the one payment? For 22 numbers, there are 4,194,303 combinations. To do that manually is extremely difficult. See FIGS. 19A and 19B. For this reason, there are many cases when bookkeepers give up and accept errors. The consequence is lost money and erroneous aging reports.

To clarify, a first list (first sequence) includes separate invoice amounts and a second list (second sequence) includes amount(s) paid. It is desired to determine which of the invoice amounts from the first list were paid with the amount paid on the second list. In one exemplary embodiment, every (or many) combinations for items from the first list are added together until the amount paid on the second list is obtained. This can be done on a brute force basis until all combinations have been tried. In another embodiment, a threshold is set (manually, for example, by a user) and all combinations added together from the first list that are within the threshold amount of the number on the second list are identified. For a first list with many items, the number of items (and combinations thereof) from the first list that need to be evaluated can be very large. With a microprocessor performing this operation, the evaluation can be performed in hours or minutes (depending on the speed of the microprocessor and the amount of data that is to be processed). In a further exemplary embodiment, various numbers of items from the first list are added together, compared with the item on the second list and displayed if equal (or if within a threshold relative to the second list item).

FIGS. 19A and 19B illustrate how for one exemplary group of combinations there may be seven exemplary solutions. Users may have a problem identifying which one of the seven is the correct one, but this is still within the realm of human capability. In some cases, there could be so many viable solutions that it is still hard to figure out which one is the correct one.

Figure 20:
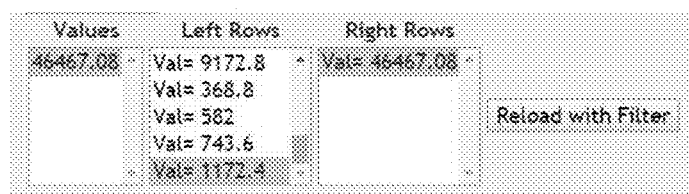
FIG. 20 illustrates exemplary data used with combination filtering.

FIG. 20 illustrates an exemplary embodiment of the present invention in which combinations are used for filtering multiple solutions. Again, in the example there are seven solutions. A table can be generated that shows the count of each value in all of the solutions. The user can see that some values, like value 2 as shown in Table 1 on the Figure, appears in all seven solutions. Value 3 appears in 3 solutions.

Assume a user knows that the solution needed includes value 16 with a value of $1,172.40. User can filter all of the solutions to only show those that include that $1,172.40 value. The filter is shown in the Figure as well as the results of the filter. It shows the count of the values that appear in the filtered solution.

Figure 21:
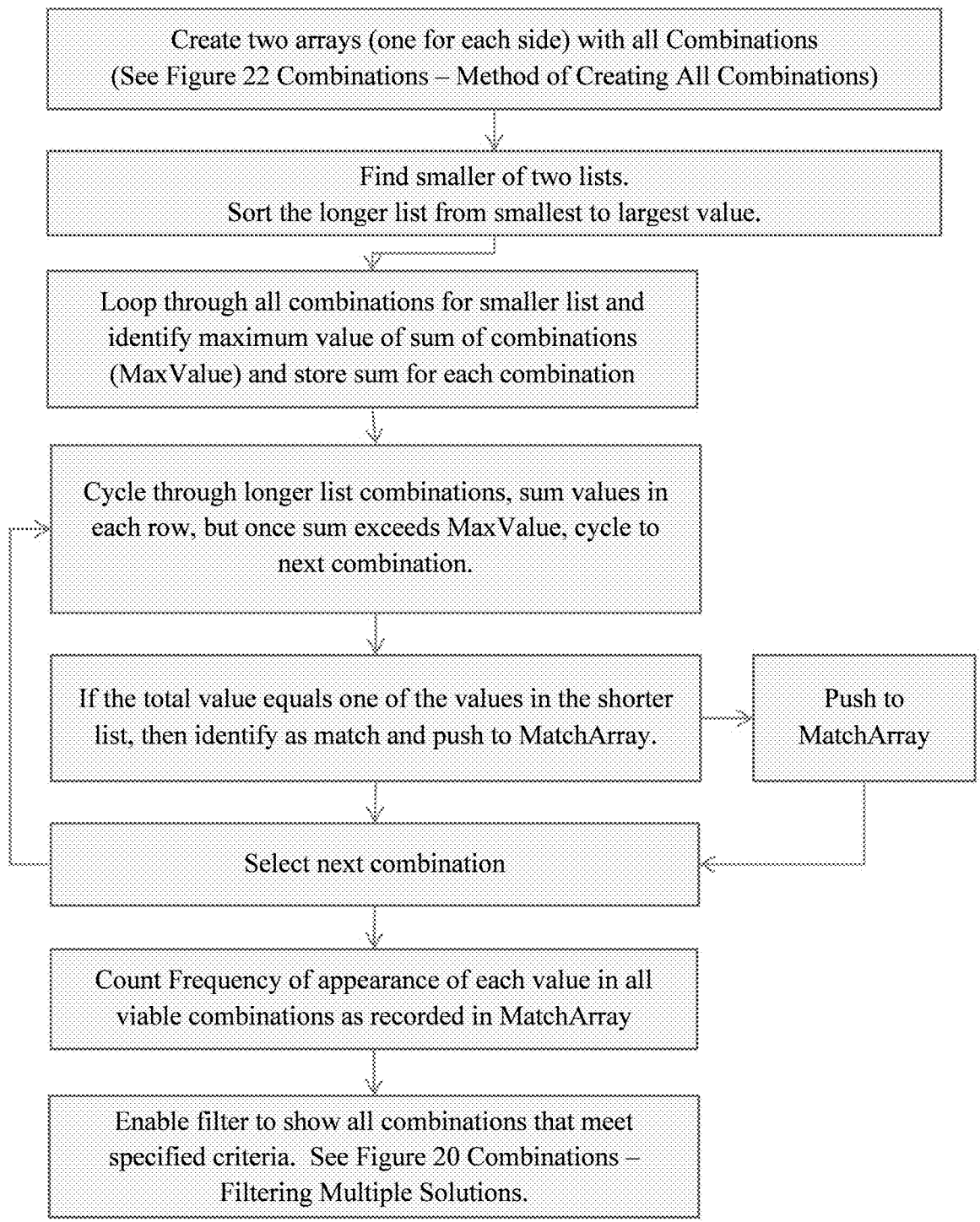
FIG. 21 is a flowchart diagram in accordance with an exemplary embodiment of the present invention.

FIG. 21 illustrates an exemplary embodiment of the present invention in which combinations are calculated based on an exemplary programming methodology. The flow chart for the solution is in the Figure. The discussion below relates specifically to the exemplary problem identified in FIG. 18.

1. Calculate how many combinations there are. See FIGS. 1A and 1B.
2. Identify smaller list. In this case, it is the payment with only one item on the list. The value is 46,167.08. This becomes the MaxValue as shown in the flow chart in the figure.
3. Calculate how many combinations there are in the second list. Per FIG. 18., there are 4,194,303 combinations, but the system has a cap of 2,000,000 at this point. So the system cycles through the number of viable combinations up to the point of the cap. See FIG. 23. So the system only looks at 1,744,435 combinations
4. Create an array with the second list. This is the 1,744,435 combinations. So row 1 could be [1], and row 2 could be [2], and row 1,000,000 could be [1, 2, 3, 5, 8, 9, 12 ]. (This is just an example, the actual elements in the array may differ. The order of these combinations do not matter provided they are all unique and they are complete.) The technique to populate this array with 1,744,435 is the same as shown in FIG. 22.
5. Sort the second list from smallest to largest.
6. Cycle through each combination. In each combination start summing the values. If the value exceeds the MaxValue, then stop summing and skip to the next combination.
7. If the summed value equals any one of the values in the shorter list, then it is a considered a good match and that entire combination should be pushed to a new array called MatchArray.
8. So now it's easy to report all the combinations in the MatchArray to the user; however, if there are a large number of combinations, this may be impossible.

If there are many combinations, there is a filter that can limit the combination so that it contains specific numbers. See FIG. 20.

FIG. 22 illustrates an exemplary method for identifying numbers of combinations (summations of all, or less than all of the numbers in a sequence). An exemplary method of creating all combinations is known to one of ordinary skill in the art. The screenshot in the FIG. 22 shows how combinations may be created.

The example in the Figure shows all combinations of 5 numbers taken 3 at a time. All 10 combinations are shown in the Figure. The method of formula for determining the number of combinations is $$\frac{n!}{r!(n-r)!}$$

In our example n=5 and r=3. So n!/r!=5*4. So (n-r)!=2!. That means that the number of combinations is 20/2, which also equals 10. And that's the number of combinations shown in the Figure.

Because of the cap of 2,000,000 combinations (which can be adjusted upward or downward depending on the power of the computing platform), not all of the possible combinations are tested. Per FIG. 23, 22 numbers taken 1 way has 22 combinations. Taken two ways is an additional 231 combinations. Taken 3 ways is an additional 1,540. Once the cumulative surpasses the cap, then the number of values in the combination is locked at the last one prior to exceeding the cap.

In the case of 22 values and a cap of 2,000,000, the maximum number of combinations evaluated is 1,744,435, as highlighted on the Figure.

Consequently, only 10 numbers (at a time) are tested (by being added together). If there were 11 values needed to reach the desired value, then the system will not find a matching combination.

In the current version of the software, the calculations continue even past the 2,000,000 threshold, but the software allows the user to mouse click a button that stops and restarts calculations.

Figure 25:
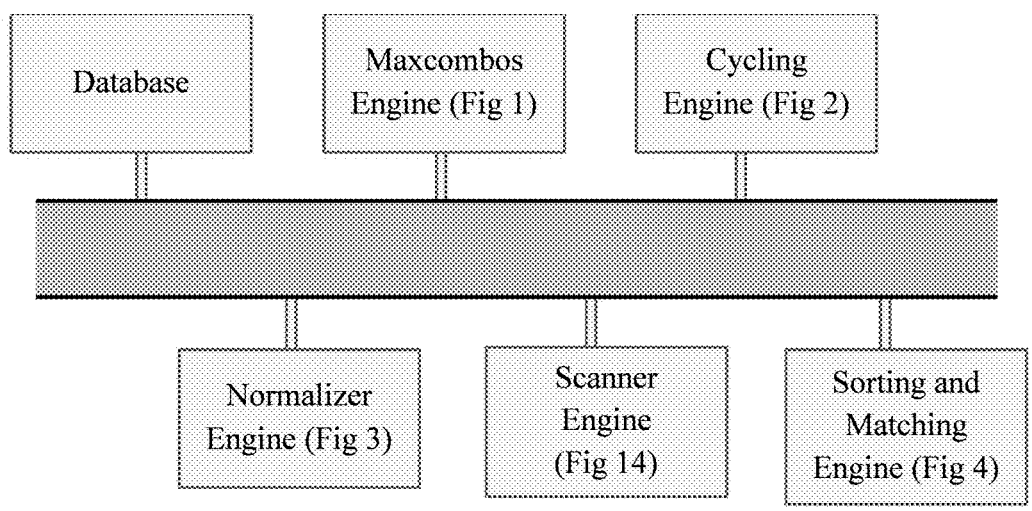
FIG. 25 is a block diagram which illustrates the use of various engines in accordance with an exemplary embodiment of the present invention.

FIG. 25 is a block diagram that illustrates how there are several engines that work to organize a database to identify discrepancies and inconsistencies in the data. The diagram includes the Maxcombos engine which is used to calculate how many possible combination of values can be calculated from the error data. It includes the Cycling Engine which counts the number of values in each set of data and then compares the count. It includes the Normalizer which will transform data, such as the sign of a value or the case of text, so that comparisons are accurate. It includes the Scanner Engine, which recommends different categories for the fields, such as summation and key fields, based on the name of the field header and the type of data. It includes the sorting and matching engine, which cycles through data to match on key fields and compare on that basis as well.

Figure 26:
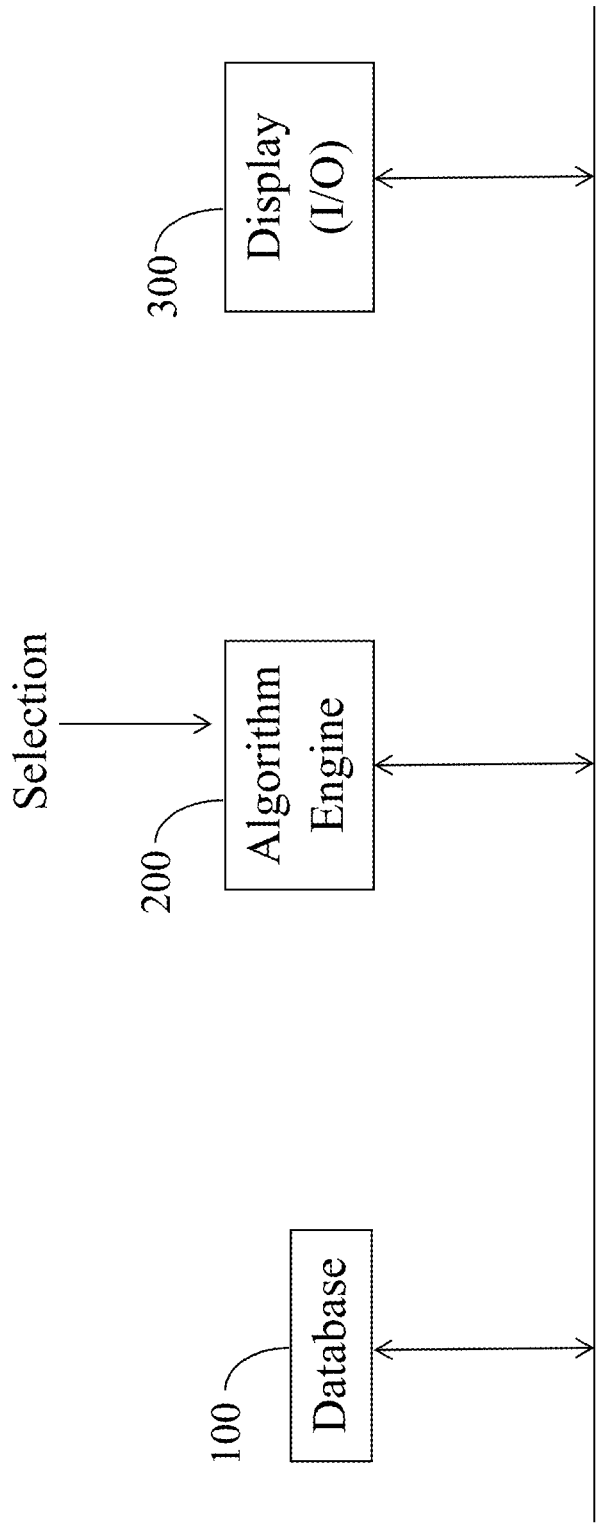
FIG. 26 is a block diagram which illustrates various components of an exemplary embodiment of the present invention.

FIG. 26 is a block diagram in accordance with a further exemplary embodiment of the present invention. Database 100 is for providing a first sequence of numbers and a second sequence of numbers. Algorithm engine 200 is for providing a plurality of respectively different algorithms to compare the first sequence of numbers and the second sequence of numbers, selecting (via a selector) at least one of the algorithms to compare the first sequence of numbers and the second sequence of numbers, and applying the selected at least one of the algorithms to the first sequence of numbers and the second sequence of numbers in order to identify the error, wherein the error is a discrepancy between one of the numbers in the first sequence and another of the numbers in the second sequence. Display 300 is for displaying the error by simultaneously displaying and indicating the one of the numbers and the another of the numbers. At least one of the algorithms the one of the numbers and the another of the numbers have a matching associated label. At least one of the algorithms applies fuzzy matching to the one of the numbers and the another of the numbers. At least one of the algorithms adds ones of the numbers from the first sequence to obtain a partial addition sum and displays the partial addition sum with the another of the numbers. For at least one of the algorithms the discrepancy is between non-identical positions within the first sequence and the second sequence.

Figure 27:
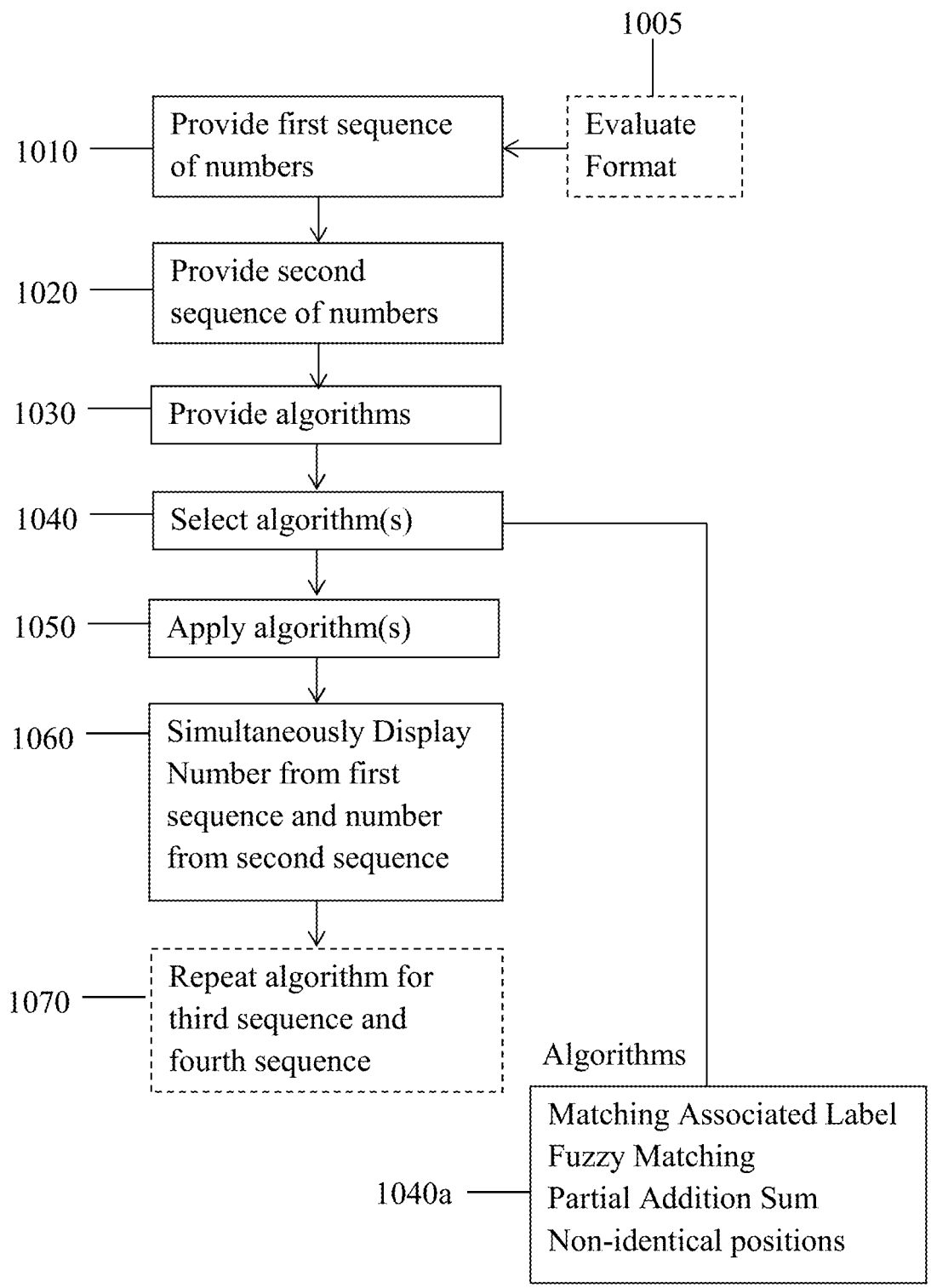
FIG. 27 is a flow chart diagram that illustrates the operation of an exemplary embodiment of the present invention.

FIG. 27 is a flow chart diagram that illustrates operation of an exemplary embodiment of the present invention. At step 1010, a first sequence of numbers is provided. At step 1020, a second sequence of numbers is provided. At step 1030, several different algorithms are provided for comparing the first sequence of numbers and the second sequence of numbers. At step 1040, one or more of the algorithms are selected. At step 1050, the one or more algorithms that have been selected to the first sequence of numbers and the second sequence of numbers in order to identify the error, wherein the error is a discrepancy between one of the numbers in the first sequence and another of the numbers in the second sequence. At step 1060, the one of the numbers in the first sequence and the another of the numbers in the second sequence are displayed simultaneously. At shown at step 1040a, the one or more algorithms that may be selected include: a) an algorithm for which the one of the numbers and the another of the numbers have a matching associated label; b) an algorithm that includes the use of fuzzy matching; c) and algorithm which adds various combinations of several numbers from the first sequence and displays the result for sums that are either equal to a number in the second sequence or are within a threshold amount of the number in the second sequence; and d) an algorithm for use with a discrepancy between non-identical positions within the first sequence and the second sequence.

In a further exemplary embodiment, the display includes information that may be helpful for understanding and/or interpreting data that appears (or may have previously appeared) on the display. Thus, for example, for each data item, a note can be entered and later displayed. Furthermore, the quality of the note can be rated, for example, by selecting one or more stars. In this manner, a subjective assessment of data that is displayed can be provided. Furthermore, the display features facilitate the ability to locate differences, notate those differences, star those differences, and report on those differences.

Figure 29:
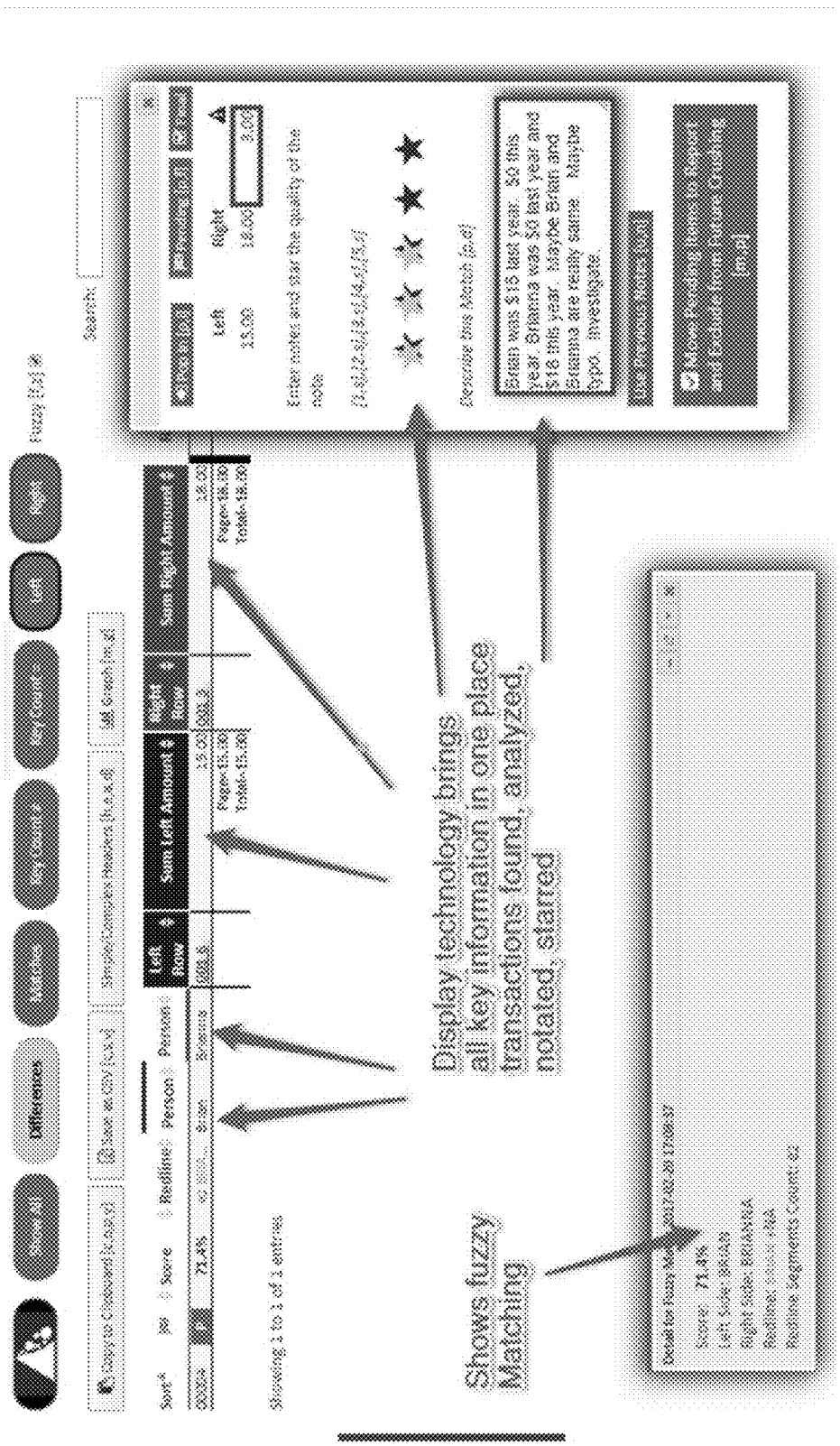
FIG. 29 is a screen shot that illustrates the association of text with data in accordance with an exemplary embodiment of the present invention.

For example, note the two tables that appear in FIG. 28. In the figure, there are five amounts on the left with a total of $125, and there are five amounts on the right with a total of $133. In one exemplary embodiment of the present invention, amounts with labels (in this example "person") are compared to determine which are identical. Furthermore, as previously explained, it is possible to provide a note that is related to the entries that are identical in the left and right column. Furthermore, the note can be given one or more stars to indicate the quality of the note. Next, for example, it is possible to remove the identical entries from view which, in this example, will result in James and Brian in the left column and James and Brianna in the right column. With regard to James, if for example the two columns correspond to respectively different years, James' increase of $5 can be noted, and then James entries can be obscured from view. Thus, only Brian and Brianna remain. The two names (Brian/Brianna) differ by only two characters and thus there is a strong possibility that the name Brianna is simply a typographical error. Again, these entries can be given a note (i.e. "Brian was $15 last year. $0 this year. Brianna was $0 last year and $18 this year. Maybe Brian and Brianna are really same. Maybe typo. Investigate.") and then given one or more stars to indicate the quality of the note. This is illustrated in FIG. 29. The note is available for retrieval, for example, by hovering over the data associated with the note. Also, note how the optional feature of fuzzy matching may be included. In the example, Brian and Brianna receive a fuzzy matching score of 71.4%. The score may be high enough to indicate that the difference between the two names is merely the result of a typographical error.

In a further exemplary embodiment of the present invention, further features are included in order to improve the user experience, as follows:

1. Enable selection of desired combination among the viable combinations and then re-running the combinations function with the remaining unmatched items.
2. Extending the combination function so it can be paused and played for as long as the user desires even if there are tens of millions of combinations.
3. Automating the combination selection process such that combinations will automatically be selected for multiple bills and payments, for example, with certain criteria. One criterion could be that payments can only be matched with bills that are more than 30 days old.

This process could be run with every possible combination to determine the maximum way of matching bills and payments, with optimum meaning the way to match the most number of bills to payments. Depending on the quantity of data and computing speed, it could take days to complete such an optimization process.

4. Connect to third party platforms to populate data.

While the present invention has been described herein with reference to exemplary embodiments, it should be understood that the invention is not limited thereto. Those skilled in the art with an access to the teachings herein will recognize additional modifications, applications, and embodiments within the scope thereof and additional fields in which the invention would be useful.

While the above description is with regard to a first and second sequence, it is understood, that the first sequence, the second sequence or both may comprise not more than one number. Alternatively, the first or second sequence may comprise multiple numbers. In another embodiment, the first sequence and the second sequence may each comprise multiple numbers.

The above description is with regard to a first and second sequence. In a further exemplary embodiment of the present invention, identification of the one or more algorithms that have been applied to the first and second sequence is retained, and the one or more algorithms are then applied to further sequences, such as a third sequence and a fourth sequence.

In a further exemplary embodiment of the present invention, the first and second sequence are stored in a known database, and the one or more algorithms are selected based on the known database the first and second sequence are stored in. In one embodiment, an auto-detect feature detects the known database on an automated basis (for example, by detecting a name of a software package that use the known database) and then selects the one or more algorithms on the basis of the auto-detection. In another exemplary embodiment, a user manually enters information so that the database configuration can be identified (for example by entering or selecting the name of a software package that uses the known database). One or more algorithms are then selected based on the user input. The step of selecting one or more algorithms may also include selecting from where in a database the first and second sequence are located.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.).

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein, it is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments. Furthermore, the following "claims" are not necessarily true patent claims and are intended to merely summarize without limiting the description set forth above.

The invention claimed is:

1. A method for identifying and notating one or more discrepancies between a first dataset and a second dataset on a computer, having a processor with a display and user input from a user, each of said datasets having data arranged in columns and rows and wherein each column has a column header, and wherein one of said columns in each dataset comprises numeric data for reconciliation and wherein one or more columns comprise label data, first dataset being from a first source and forming a first source dataset and said second dataset being from a second source and forming a second source dataset and wherein said first source and said second source are different, said method comprising the steps of:
  (a) defining, by the user, correspondingly pertinent columns in said first source dataset and in said second source dataset, wherein one of said correspondingly pertinent columns in each dataset comprises numeric data and wherein at least one of said correspondingly pertinent columns in each dataset comprises label data;
  (b) associating, by said processor, fuzzy label data in any one row of said first dataset
    (1) to labels in any other row of said first source dataset; and
    (2) to labels in any row of said second source dataset;
    then calculating, by said processor, a numeric sum of said numeric data in each dataset for every label data that are identical;
  (c) comparing, by said processor, each numeric sum sum of every identical label data between said first source dataset and said second source dataset, said processor determining numeric sums that are equal for identical label data and numeric sums that are unequal for identical label data;
  (d) displaying on said display, by said processor, said numeric sums that are unequal for identical label data for defining at least one discrepancy, said processor alerting the user that particular label data in said correspondingly pertinent columns are similar, although not identical, using fuzzy matching properties of said label data;
  (e) permitting the user to enter comments about said displayed at least one discrepancy using said user input; and
  (f) said processor saving step (a) to permit said processor to reproduce said correspondingly pertinent columns for identifying one or more discrepancies in other data between said first and second source datasets.

2. A method according to claim 1, wherein said step of defining correspondingly pertinent columns comprises identifying column headers in said first source dataset that have the same sequence of alphanumeric characters in column headers in said second source dataset.

3. A method according to claim 1, wherein said step of defining correspondingly pertinent columns comprises identifying column headers in said first source dataset that have abbreviations of alphanumeric characters in column headers in said second source dataset.

4. A method according to claim 1, wherein said step of using fuzzy matching properties comprises applying letter transpositions to determine whether to associate the label data in any one row of said first source dataset to the label data in any other row of said first source dataset and to the label data in any rows of said second source dataset.

5. A method according to claim 1, wherein said step of using fuzzy matching properties comprises utilizing an algorithm that calculates a Levenshtein Distance between two sets of text in label data being compared.

6. Apparatus for identifying and notating one or more discrepancies between a first dataset and a second dataset, each of said datasets having data arranged in columns and rows and wherein each column has a column header, and wherein one of said columns in each dataset comprises numeric data for reconciliation and wherein one or more columns comprise label data, said first dataset being from a first source and forming a first source dataset and said second dataset being from a second source and forming a second source dataset and wherein said first source and said second source are different, said apparatus comprising:
  a computer having a processor, a display and a user input from a user and wherein the user defines correspondingly pertinent columns in said first source dataset and in said second source dataset and wherein one of said correspondingly pertinent columns in each dataset comprises numeric data and wherein at least one of said correspondingly pertinent columns in each dataset comprises label data;
  a database, in communication with said computer, for providing the first and second source datasets to said computer;
  said processor associating label data in any one row of said first source dataset to label data in any other row of said first source dataset and to label data in any row of said second source dataset, said processor then calculating a numeric sum of said numeric data in each dataset for every label data that are identical, said processor comparing each numeric sum of every label data that are identical between said first source dataset and said second source dataset, said processor determining numeric sums that are equal for identical label data and numeric sums that are unequal for identical label data, said processor displaying on said display said numeric sums that are unequal for identical label data for defining at least one discrepancy, said processor alerting the user that particular label data in said correspondingly pertinent columns are similar, although not identical, using fuzzy matching properties of said label data;
  wherein said processor permits the user to enter comments on said display about said displayed at least one discrepancy using said user input; and
  wherein said processor saves said correspondingly pertinent columns for identifying one or more discrepancies in other data between said first and second source datasets.

7. Apparatus according to claim 6, wherein said correspondingly pertinent columns are defined by identifying column headers in said first source dataset that have the same sequence of alphanumeric characters in column headers in said second source dataset.

8. Apparatus according to claim 6, wherein said correspondingly pertinent columns are defined by identifying column headers in said first source dataset that have abbreviations of alphanumeric characters in column headers in said second source dataset.

9. Apparatus according to claim 6, wherein said fuzzy matching properties comprises said processor applying letter transpositions to determine whether to associate the label in any row of said first source dataset to the label data in any other row of said first source dataset and to the label data in any rows of said second source dataset.

10. Apparatus according to claim 6, wherein said processor using fuzzy matching properties comprises said processor utilizing an algorithm that calculates a Levenshtein Distance between two sets of text in label data being compared.

* * * * *